United States Patent
Radziszewski

(10) Patent No.: US 7,342,664 B1
(45) Date of Patent: Mar. 11, 2008

(54) SCANNING DOUBLE-BEAM INTERFEROMETER

(76) Inventor: Juliusz George Radziszewski, 13909 W. 23rd Ave., Golden, CO (US) 80401

( * ) Notice: Subject to any disclaimer, the term of this patent is extended or adjusted under 35 U.S.C. 154(b) by 129 days.

(21) Appl. No.: 11/124,422

(22) Filed: May 6, 2005

Related U.S. Application Data

(60) Provisional application No. 60/569,291, filed on May 6, 2004.

(51) Int. Cl.
G01B 9/02 (2006.01)
(52) U.S. Cl. ................................................ 356/455
(58) Field of Classification Search ............... 356/451, 356/452, 455; 250/339.07, 339.08
See application file for complete search history.

(56) References Cited

U.S. PATENT DOCUMENTS

| | | | | | |
|---|---|---|---|---|---|
| 3,922,065 | A | * | 11/1975 | Schultz | 359/514 |
| 4,086,652 | A | * | 4/1978 | Mantz | 356/452 |
| 4,795,253 | A | * | 1/1989 | Sandridge et al. | 356/452 |
| 5,021,941 | A | | 6/1991 | Ford et al. | |
| 5,331,399 | A | * | 7/1994 | Tank et al. | 356/455 |
| 5,341,207 | A | * | 8/1994 | Tank et al. | 356/455 |
| 5,486,918 | A | * | 1/1996 | Nagashima | 356/452 |
| 5,675,414 | A | * | 10/1997 | Rowell et al. | 356/451 |
| 5,917,516 | A | | 6/1999 | Nguyen et al. | |
| 5,949,544 | A | * | 9/1999 | Manning | 356/452 |
| 5,998,786 | A | | 12/1999 | Movaghar et al. | |
| 6,016,207 | A | | 1/2000 | Wield | |

FOREIGN PATENT DOCUMENTS

EP    0 411 250 A1 *  4/1990

OTHER PUBLICATIONS

Agladze et al. (Dec. 2004) "Miniaturization of Holographic Fourier-Transform Spectrometers," Appl. Optics 43 (36):6568-6579.

Boer et al. (Apr. 2004) "Compact Liquid-Crystal-Polymer Fourier-Transform Spectrometer," Appl. Optics 43 (11):2201-2208.

Collins et al. (Jun. 1999) "Fourier-Transform Optical Microsystems," Optics Lett. 24(12):844-846.

Huang et al. (Dec. 2002) "Data Compression of High-Spectral Resolution Measurements," SDR Conference for the Americas, Dec. 9-13, 2002, Miami, Florida.

Knipp et al. (Mar. 2005) "Silicon-Based Micro-Fourier Spectrometer," IEEE Trans Electron. Dev. 52(3):419-426.

(Continued)

Primary Examiner—Samuel A Turner
(74) Attorney, Agent, or Firm—Greenlee, Winner and Sullivan P.C.

(57) ABSTRACT

Scanning interferometer and method of using same providing for rapid, reliable detection of chemical compounds that are readily implemented in low-cost, portable configurations for application in a variety of monitoring and detection applications. A scanning double-beam interferometer, particularly a Michelson interferometer, in which the length of at least one of the optical paths (or arms) of the interferometer is selectively adjustable by use of an actuator in which rotational displacement of a rotatable element is converted into linear displacement of at least one reflective surface which forms an end of an optical path of the interferometer is employed to obtain interferograms of electromagnetic radiation attenuated, emitted, scattered or reflected from a sample. The length of the optical path that is adjusted is determined using an optical detection scheme, particularly where marking on the rotatable element are detected to determine linear displacement of the reflective surface.

19 Claims, 8 Drawing Sheets

OTHER PUBLICATIONS

Kruzelecky et al. (2004) "Miniature High-Performance Infrared Spectrometer for Space Applications," Proceedings of the 5th International Conference on Space Optics, Mar. 30-Apr. 2, 2004, Toulouse, France, pp. 203-210.

Lohninger, H. (1998) "Spectral Data Bases and Interpretation Systems," OMPANA, Duisburg, Germany, http://www.lohninger.com/spectroscopy/dball.html.

Manzardo, O. (Aug. 2004) "Micromachining Yields Compact FT Spectrometers," Photonics TechnologyWorld.

Manzardo, O. (2002) "Micro-Sized Fourier Spectometers," Dissertation, Neuchantel University, France.

Manzardo et al. (Dec. 1999) "Miniaturized Time-Scanning Fourier Transform Spectrometer Based on Silicon Technology," Optics Lett. 24(23):1705-1707.

Schilz, J. (2000) "Applications of Thermoelectric Infrared Sensors (Thermophiles): Gas Detection by Infrared Absorption; NDIR," Perkin Elmer Thermophys. Min. 8(22).

Wallrabe et al. (2005) "Miniaturized Fourier Transform Spectrometer for the Near Infrared Wavelength Regime Incorporating and Electromagnetic Linear Actuator," Sensors Actuators A 123-124:459-467.

* cited by examiner

SCANNING DOUBLE-BEAM INTERFEROMETER

CROSS-REFERENCE TO RELATED APPLICATIONS

This application claims priority to U.S. provisional application Ser. No. 60/569,291, filed May 6, 2004 which is incorporated by reference herein in its entirety.

BACKGROUND OF THE INVENTION

Certain conventional Fourier transform spectrometers employ double-beam interferometers. Michelson and Mach-Zehnder interferometer configurations are most typically employed. In double-beam interferometers, a beam from a light source is divided (or split) into two parts (two beam components) which thereafter undergo wavelength-dependent phase shifts and are coherently combined in a manner producing optical interference. In a Michelson interferometer, a collimated beam from a light source is split into two beam components by passage through a beamsplitter and each of the split beams pass or are directed to reflectors. An optical path is formed between the beamsplitter and each of the reflectors. The length of the optical path of a beam component is twice the distance between the beamsplitter and the reflector. The reflectors reflect the split beam components back along the same optical paths to the beamsplitter, wherein the beam components coherently recombine and undergo optical interference thereby forming an output beam. The intensity of the output depends on the wavelengths of light of the beam and the difference in optical paths between the beamsplitter and each of the two mirrors. If the difference in the optical paths of the two beams is zero or a multiple of the wavelength of the light of the beams (for any wavelength), then the intensity of the beams is a maximum, and when the difference in the optical paths is an odd multiple of half the wavelength of the light, then the intensity of the beams is a minimum. Detection of the output light as a function of time provides an interference spectrum (or an interferogram).

In such a Fourier transform spectrometer, one of the reflectors (e.g., a moving mirror) is moved (i.e., scanned) in a direction parallel to the optical path of the beam component and typically one of the reflectors is held in a fixed position. This scanning of the reflector changes the difference in optical path length between the two optical paths (also called arms) of the interferometer. As a result, the output beam alternates between bright and dark fringes (e.g., higher intensity and lower intensity fringes). If the beam is comprised of monochromatic radiation, then the intensity of the output is modulated by a cosine wave. In contrast, if the beam is not monochromatic, the output detected is the Fourier transform of the spectrum of the input beam. The intensity distribution as a function of wavelength can therefore be recovered by performing a Fourier transform of the detected output signal as a function of time. Passage of the output beam through a sample (e.g., a gas or a liquid) or reflection and/or scattering of the output beam from a sample (e.g., a liquid or a solid) prior to detection provides the Fourier transform of the absorption (or reflection or scattering) spectrum of the sample. This absorption spectrum of the sample is obtained by performing a Fourier transform of the detected output which has passed through (or was reflected from) the sample.

Spectra obtained from a FT spectrometer can be used for sample identification, e.g., for identifying chemical components in a sample, and/or for monitoring the concentrations of sample components. FT spectrometers can be employed to measure absorption, reflection, scattering and emission spectra. FT spectrometers can generally be employed over the entire electromagnetic range of wavelengths, including the microwave region, but are particularly useful for chemical analysis in the UV, visible and infrared region. It is the infrared region which contains information about vibrational fingerprints for chemical compound identification. FT spectrometers are often employed in infrared absorption and Raman scattering spectroscopy. Because, all chemical compounds either exhibit significant absorption in the infrared or Raman activity, infrared and Raman spectroscopy can be employed to provide spectral fingerprinting of chemical compounds to allow chemical identification and concentration monitoring in various environments or samples containing mixtures of different chemical components.

Conventional FT spectrometers require a high-precision mirror scanning mechanism with linear change at constant scanning velocity which results in large size and high cost. Low-cost, small-size, portable FT spectrometers, and those in particular which retain sufficiently high resolution for chemical identification, are, however, desirable for many applications. The present invention provides a low-cost, portable FT spectrometer, particularly useful for infrared absorption, Raman and surface enhanced vibrational spectroscopy.

Attempts to design and build miniature instruments that exploit the advantages of Fourier spectroscopy have been rare. For example, O. Manzardo, "Micro-sized Fourier Spectrometers" *Photonics Technology World*, August, 2004 reports two specific miniaturized spectrometers: a spatially-modulated Fourier spectrometer 9described as stationary) and a time-scanning interferometer. The stationary spectrometer is characterized as operating in the visible and as having no moving parts, no imaging system and being compact. The time-scanning spectrometer reported to be based on micro-optical electromechanical systems (MOEMS) technology employs an electrostatic comb drive actuator to scan the mirror. The resolution of this time-scanning spectrometer is reported to be 6 nm at a wavelength of 633 nm.

Applications for low-cost, portable FT spectrometers are vast. Military, defense and security applications include, for example, personal monitors for the detection of chemical warfare agents (CWAs), hazardous industrial chemicals, or explosives, and for monitoring air intake to public (or private) buildings. Low-cost, portable FT spectrometers will be particularly useful for monitoring the chemical composition of selected industrial or home environments for the presence of potentially hazardous conditions or chemicals, for example, monitoring air in chemical manufacturing plants, in mining operations, in mass transportation for monitoring planes, trains, buses as well as airports and other transportation terminals or monitoring homes or other living environments for natural gas leaks, or the presence of CO or other noxious gases. Low-cost, portable FT spectrometers equipped for unmanned operation can be used to create a network for monitoring environmental conditions over wide areas, e.g., for monitoring air quality in a city or region. Such networks would also have military and security applications for the detection of explosives, CWAs or hazardous industrial chemicals. Low-cost, portable FT spectrometers have specific applications for law-enforcement, for example, to provide on-the-spot instant identification of drugs or explosives. Low-cost, portable FT spectrometers can be installed in combustion vehicles (cars, trucks, etc.) to optimize combustion with a real-time feedback and to minimize pollution. Low-cost, portable FT spectrometers also have specific biomedical applications, for example for non-invasive monitoring medication content in the blood or other chemical analysis of biological materials. Low-cost, portable FT spectrometers can be specifically employed in monitoring process and/or quality control industrial applications in various industries including, the chemical, food, and pharmaceutical industries. Additionally, low-cost, portable FT spectrometers can be used to replace conventional FT spectrometers in various known analytical and monitoring applications.

SUMMARY OF THE INVENTION

This invention provides instrumentation and methods for rapid, reliable detection of chemical compounds that are readily implemented in low-cost, portable configurations for application in a variety of monitoring and detection applications.

This invention provides a scanning double-beam interferometer, particularly a Michelson interferometer, in which the length of at least one of the optical paths (or arms) of the interferometer is selectively adjustable by use of an actuator in which rotational displacement is converted into linear displacement of at least one reflective surface which forms an end of an optical path of the interferometer. Preferably only one of the reflective surfaces (reflectors) is moveable and one is fixed.

A scanning interferometer of this invention comprises:
a beamsplitter;
a first reflector separated from the beamsplitter by a first optical path for passage of a first beam of electromagnetic radiation;
a second reflector separated from the beamsplitter by a second optical path for passage of a second beam of electromagnetic radiation wherein the position of the second reflector is selectively adjustable to selectively adjust the length of the second optical path and wherein the first and second optical paths intersect at the beamsplitter to allow recombination of the first and second beams of electromagnetic radiation; and
an actuator which functions for selective adjustment of the length of the second optical path wherein the actuator converts rotational displacement of at least one rotatable element into linear displacement of the second reflector.

At least one rotatable element of the actuator is operationally coupled to the second reflector such that rotation of the rotatable element causes a linear displacement of the second reflector. The actuator and the second reflector are positioned with respect to the beamsplitter such that the second optical path is formed between the beamsplitter and the second reflector and such linear displacement of the second reflector caused by rotation is along the second optical path and changes the length of the second optical path. The rotatable element is preferably operated at a constant rotational velocity.

Linear displacement of the second reflector as a function of rotation of the at least one rotatable element changes the length of the second optical path from a minimum to a maximum length. The difference between the maximum length and the minimum length is the range of linear displacement of the second reflector. This range is selected appropriate for a give application by choice of size and placement of actuator components and the reflector. A full rotation of the rotatable element scans the range of linear displacements of the second reflector from a minimum to a maximum displacement and back from the maximum to the minimum displacement. One full rotation of the rotatable element represents two scans of the linear displacement range.

In a first embodiment, the actuator comprises:
a first rotatable element that is rotatable around a first rotation axis;
a second rotatable element that is rotatable around a second rotation axis;
a linker element rotationally coupled between the first and second rotatable elements at coupling points on the first and second rotatable elements, respectively, which are each offset from the first and second rotation axes, respectively, by the same offset distance;
and a driving mechanism (e.g., a motor) for rotating the first rotatable element wherein rotation of the first rotatable element actuates synchronous rotation of the second rotational element and actuates linear displacement of the linker element without rotating the linker element with respect to a line intersecting the first and second rotation axes of the first and second rotatable elements.

In a scanning interferometer comprising the actuator of this first embodiment, the second reflector is the linker element or is mounted on the linker element, the actuator is positioned such that the second reflector is positioned with respect to the beamsplitter to form the second optical path, and rotation of the first rotational element actuates linear displacement of the second reflector along the second optical path to selectively adjust the length of the second optical path. The second reflector on the linker element (or which is the linker element) moves in a direction that is perpendicular to a line connecting the rotation axes of the first and second rotatable elements. The velocity of the second reflector in that direction is a cos function of the angle of rotation $\alpha$ ($\alpha=\omega t$, where $\omega$ is constant angular velocity). This embodiment of the scanning interferometer is exemplified in FIGS. 1A and B.

In a preferred first embodiment, the first and second rotation elements are synchronously rotated. Synchronous rotation of the rotatable elements is accomplished, for example, by coupling rotation of the two rotatable elements employing a belt, gear or equivalent coupler (which is in addition to the linker element) and rotating one of the rotatable elements with a driving mechanism, such as a motor. Synchronous rotation of the rotatable elements can alternatively be accomplished by employing a motor for each of the rotatable elements where the motors are electrically coupled or otherwise coupled to provide synchronous rotation. Although no two motors can be perfectly synchronized while working separately, the linker element functions to assure unison rotation. Synchronous rotation of the rotatable elements provides for enhanced stability of the interferometer.

In a related embodiment, the first and second rotatable elements are each a pair of spaced-apart concentric rotatable elements and the second reflector is mounted on a linker element (or is a linker element) as described above, but the linker element is positioned in the space between the members of the pair of concentric rotatable elements and is attached to each member of both pairs of rotatable elements. This embodiment provide for improved stability of the linker element and the second reflector and minimizes or avoids mirror tilting. This alternative embodiment is illustrated in FIG. 1 C.

In a second embodiment, the actuator comprises:
a first stationary pivot element;
a rotatable element which is rotatable around the first stationary pivot element which pivot element is positioned at the rotation axis of the rotatable element;
a second pivot element attached to the rotatable element off set from the rotation axis of the rotatable element and which is stationary with respect to the rotatable element;
a translating element which is rotationally coupled to the second pivot element;
a coupler between the translating element and the first stationary pivot element to prevent rotation of the translating element around the second stationary pivot element; and
a driving mechanism for actuating rotation of the rotatable element wherein rotation of the rotatable element actuates revolution of the translating element around the rotation axis without rotation of the translating element around its own rotational axis that is coincident with the second pivot element.

In a scanning interferometer comprising the actuator of this second embodiment, the second reflector is mounted on the translating element (or is the translating element) and the actuator is positioned such that the second reflector is positioned with respect to the beamsplitter to form the second optical path and rotation of the first rotational element actuates linear displacement of the second reflector along the second optical path to selectively adjust the length of the second optical path. This embodiment of the scanning interferometer is exemplified in FIGS. 2A and B.

In a specific embodiment, a scanning interferometer as exemplified in FIGS. 1A and 1B, 1C or in FIGS. 2A and 2B is provided which is adapted by choice of beamsplitter, and reflectors for operation in the infrared spectral region.

In a more specific embodiment an actuator mechanism is provided for translating the second reflector without tilting that reflector with respect to the second optical path. The actuator comprises first (11) and second (12) parallel shafts separated by a selected distance (X), a first rotatable element (14) mounted on the first shaft and a second rotatable member (16) mounted on the second shaft, a first crankpin mounted (13) on the first rotatable element, wherein the first crankpin has an axial center (15) located at a selected distance (Y) from the axial center of said first shaft, a second crankpin (17) mounted on the second rotatable element, the second crankpin having an axial center (19) located at the same selected distance (Y) from the axial center of the second shaft and a rigid link (20), rotatably connected between the first and second crankpins. An angle (phi 1) is formed between a line intersecting the axial center of the first shaft and the axial center of the first crankpin (21) and a line intersecting the axial centers of the first shaft and second shafts (22), and an angle (phi 2) is formed between a line intersecting the axial center of the second shaft and the axial center of the second crankpin (23) and the line intersecting the axial centers of the first shaft and second shafts (22) (see FIG. 6). The second reflector (not shown) is mounted on the rigid link (20) and the actuator components are positioned with respect to each other and the beamsplitter such that the second reflector is perpendicular to and receives a beam split by the beamsplitter to form the second optical path. The actuator is provided with a means for synchronously rotating (e.g. various propelling mechanisms, such as a motor, may be employed) the first and second rotatable members such that the angles phi 1 and phi 2 is always equal.

The driving mechanism can be a means for synchronously rotating the first and second rotatable elements and can, for example, comprise a pair of pulleys, one connected to each of the first and second rotatable elements, and a belt coupling the pulleys and a means for rotating (e.g., a motor or other driving or propelling mechanism) one of the first or second rotatable elements. Alternatively, the means for synchronously rotating the first and second rotatable elements can comprise a pair of gears, one connected to each of the first and second members, and third gear engaging each of the pair of gears and a means for rotating (e.g., a motor or other propelling mechanism) one of the rotatable elements. In another alternative, the means for synchronously rotating the first and second rotatable elements can comprise separate means for rotating each of the first and second rotatable elements wherein the rotation imparted to both of the rotatable elements is synchronous. For example a pair of synchronous motors, one of which is coupled to each of the first and second members, respectively, can be employed or two identical gear wheels separated by the third smaller one can be used. That third wheel, attached to the motor, couples and propels simultaneously the two larger gear wheels.

In another more specific embodiment another actuator mechanism is provided for translating the second reflector without tilting that reflector with respect to the second optical path. The actuator comprises a stationary shaft having a first stationary wheel coaxially attached thereto; a first rotatable element mounted on the stationary shaft; a first crankpin mounted on the first rotatable element, the first crankpin having an axial center located at a selected radial distance (X) from an axial center of the first shaft and having a second wheel coaxially attached thereto; a second element rotatably mounted on the first crankpin, the second element rigidly coupled to the second wheel which is coaxially attached to the first crankpin; a coupler between the first wheel which is coaxially attached to the stationary shaft and the second wheel which is coaxially attached to the first crankpin for preventing rotation of the second element about the first crankpin; and a drive mechanism coupled to the first rotatable element for rotating the first rotatable member around the shaft. On rotation of the first rotatable element the second element translates around the stationary shaft without changing the angular orientation of the second element with respect to the stationary shaft. The second reflector is mounted on the second element and the actuator components are positioned with respect to each other and the beamsplitter such that the second reflector is perpendicular to and receives a beam split by the beamsplitter to form the second optical path. On rotation of the rotatable element the second reflector remains perpendicular to and receives the beam split by the beamsplitter, but the second reflector is displaced along the optical path to selectively change the length of the second optical path. The actuator is provided with a means for rotating (e.g. various propelling mechanisms, such as a motor, may be employed) the first rotatable element. In a specific embodiment, the first and second wheels comprise pulleys and the coupler comprises a belt wrapped around the pulleys. In another specific embodiment, the pulleys of the first and second wheels are first and second gears, respectively, and the coupler comprises an intermediate gear (a third gear) having teeth which engage teeth on both first and second gears. In another specific embodiment, the first and second wheels further comprise sprocket teeth and the coupler comprises a chain wrapped around the first and second wheels which engages the sprocket teeth of the first and second wheels. In another specific embodiment, the first and second wheels further comprise belt teeth and the coupler comprises a toothed belt wrapped around said first and second wheels which engages the belt teeth of the first and second wheels.

Centrifugal forces that may be induced during the rotation in the actuators described herein, due to the off-axis attached mass (e.g., the reflector or the reflector mounted on the second element) could disturb ideal rotary motion in the actuator. While this perturbation may be very small and have no significant effect on operation, it can be substantially eliminated by mass-balancing of one or more of the rotatable elements. The precision of the mass-balancing is adjusted to obtain the desired level of stability of rotation.

A scanning interferometer of this invention optionally further comprises a collimator (e.g., a collimating lens) for forming a collimated beam on introduction of electromagnetic radiation from a source into the interferometer and/or a decollimator (e.g., a lens) for focusing the collimated output beam into a detector, if needed or desirable.

The scanning interferometers of this invention can be equipped with a source of electromagnetic radiation, e.g., a light source, for introduction of electromagnetic radiation into the beamsplitter. The light source can, for example, be a light-emitting diode (LED). The light source is selected to provide electromagnetic radiation of selected wavelength as appropriate for the application intended. For example for use in the infrared an IR LED or a micro Glowbar can be employed. The light source can also be separate from the scanning interferometer and positioned at a remote location from the interferometer to provide electromagnetic radiation that is to be introduced into the beamsplitter.

The scanning interferometers of this invention can be provided with a detector for detecting electromagnetic radiation exiting the beamsplitter of the interferometer. The detector can also be separate from the scanning interferometer and positioned at a remote location from the interferometer for receiving electromagnetic radiation exiting the beamsplitter.

In one mode of operation, light exiting the interferometer passes through a sample and a change in the electromagnetic radiation passing through the sample is detected. More specifically, in a scanning interferometer adapted for infrared absorption spectrometry, infrared wavelengths are absorbed by chemical species in a sample and absorption is detected to detect one or more chemical species in the sample and optionally to quantify the amount of one or more chemical species in the sample. Chemical species that may be present can be identified generally as is known in the art, but particularly by comparison of experimental spectra and spectra of one or more reference spectra that have been collected in a database (or otherwise determined) or by comparison of calculated spectra. Monitoring changes in amounts or absolute amounts of one or more chemical species in a sample is performed generally as is known in the art. In another mode of operation, light emitted, scattered or reflected from a sample passes into the interferometer and is detected.

An particular aspect of the use of the interferometers of this invention is the method employed for determination of the position of the moving reflector (e.g., the second reflector). Optical means are well-known in the art for determining the position of an object (by detection of light reflected from the object, e.g., the reflector or its support) that have been applied in conventional scanning interferometers. While these known methods can be applied in the interferometers of the present invention, this invention provides a method for determining reflector displacement or position that is well-adapted to the rotation-linear actuators employed in the devices herein.

More specifically, the position of the reflector perpendicular to the optical axis can be determined by accurate determination of the rotation angle of the rotatable element which actuates linear displacement of the reflector. For applications herein, the position of the moving reflector is determined with sufficient precision to obtain a desired spectral resolution. In one embodiment, a surface of at least one rotatable element is provided with a plurality of detectable spaced-apart markings which indicate the rotational angle of the rotatable element and which as a consequence of the known relationship between rotation of the rotatable element and linear displacement of the second reflector also indicate the displacement of the second reflector by operation of the actuator. Optionally, at least a portion of the markings on one or more of the rotatable elements are uniquely distinguishable one from the other so that distinguishable markings can be associated with a given linear displacement of the second reflector. Optionally, each one of the plurality of markings on one or more of the rotatable elements is uniquely distinguishable one from the other and can be uniquely associated with a given linear displacement of the second reflector. Association of a given distinguishable marking in a given device to linear displacement of the second reflector can be made, for example, by performing a calibration.

In a specific embodiment, detection of markings on the rotatable element is used to trigger data collection. Data is collected for the period between detection of sequential markings and represents a portion of an interferogram of a spectrum of the electromagnetic radiation being detected. Detection of each sequential marking triggers collection of a different portion of an interferogram. A scan is complete when a selected range of linear displacements from a minimum to a maximum displacement (or a maximum to a minimum displacement) of the second reflector has been traversed by rotation of the rotatable element. The linear displacement range may be the entire possible range of linear displacements traversed by the second reflector on rotation of the rotatable element of a portion of that possible range. One rotation of the rotatable element represents two scans of the range of linear displacements. The plurality of portions of an interferograms collected over a scan represent a full interferogram of the spectrum of the electromagnetic radiation being detected. Scans are repeated, interferograms are collected and signal averaging is performed until sufficient data are collected for a given application. For example, data is collected and signal averaged until the signal to noise of a given measurement is sufficiently high to allow identification of a particular chemical species present in a sample at a given concentration.

The markings provided are typically spaced-apart from each other on one or more of the rotatable elements of the actuator can be substantially identical (i.e, have no measurable distinction). Continuous markings which are differentiated as a function of distance around or along the rotatable element may also be provided. Alternatively, at least a portion of the markings on the rotatable elements can be distinguishable from at least another portion of the markings. The markings may be distinguishable, for example, by size, shape or by their reflectivity or any other criteria that can be optically detected. Alternatively markings that are positioned on a selected area of the rotatable element may be made distinguishable from markings that are positioned in a different selected area of the same rotatable element. For example, the markings in one quadrant of a circular rotatable element maybe made distinguishable from those in the three other quadrants of the rotatable element. A rotatable element may be divided into as many sections or portions as is desired (e.g., 2, 3, 4, 5, 6, 7, 8, 9, 10, 100, 1000 or more) or as is considered practical or useful, and provided with markings that are distinguishable by section. If desired each marking on the rotatable element can be uniquely distinguishable from all other markings provided. Distinguishable markings on the rotatable element can be associated with a given linear displacement. The association of the markings with linear displacement can be determined by a calibration method if desired or needed. The resolution of spectral data collected in a function of the number of markings provided on the rotatable element. For applications in the infrared spectral region a minimum resolution of 0.5 of a wavenumber is preferred.

The invention also provided methods for detection of electromagnetic radiation generated from a sample or that has passed through a sample as interferograms which comprises the steps of:

(a) providing a scanning interferometer of this invention as described above;

(b) introducing electromagnetic radiation generated from a sample or from a source of electromagnetic radiation of selected wavelength range into the beamsplitter of the scanning interferometer;

(c) rotating the at least one rotatable element at constant rotational velocity to continuously scan the range of possible linear displacements of the second reflector from a minimum to a maximum displacement and back from the maximum to the minimum displacement wherein one full rotation of the at least one rotatable element represents two scans of the possible linear displacement range;

(d) periodically determining the length of the second optical path; and (e) periodically detecting electromagnetic radiation exiting the beamsplitter or periodically detecting electromagnetic radiation that has exited the beamsplitter and passed through a sample such that data is collected between each sequential determination of the length of the optical path to provide a plurality of portions of an interferogram wherein data collection over a scan of the possible linear displacement range provides a full interferogram, Steps (c)-(e) are optionally repeated a number of times sufficient to collect a desired number of interferograms for signal averaging to obtain desired information. The information that may be obtained includes, for example, absorption, emission, reflection or scattering spectra of samples, the detection of one or more discrete wavelengths of absorbed, emitted, reflected or scattered electromagnetic radiation from a sample, determination of relative amounts or absolute amounts of chemical species in samples; detection of a change in concentration of one or more selected chemical species As noted above, a plurality of spaced-apart detectable markings can be provided on one or more of the rotatable elements of the scanning interferometer. The position of the markings is related to linear displacement of the second reflector. Detection of a marking triggers data collection of a portion of an interferogram and collection of that portion of an interferograms continues until the next marker in sequence is detected. A portion of an interferogram is thus collected between each pair of sequential markers. The portions of an interferogram collected over a scan of the linear displacement range of the second reflector provide a full interferogram.

The method of this invention can be practiced over any range of electromagnetic radiation, but is particularly useful for applications in the infrared regions.

The invention further provides beamsplitters, for operation in the infrared wavelength range, that are light-weight and readily manufactured at low-cost, and which are particularly well suited for the construction of FTIR spectrometers.

BRIEF DESCRIPTION OF THE DRAWINGS

FIG. 1A provides a top plan view and FIG. 1B provides a side view.

DETAILED DESCRIPTION OF THE INVENTION

Figure 1A:
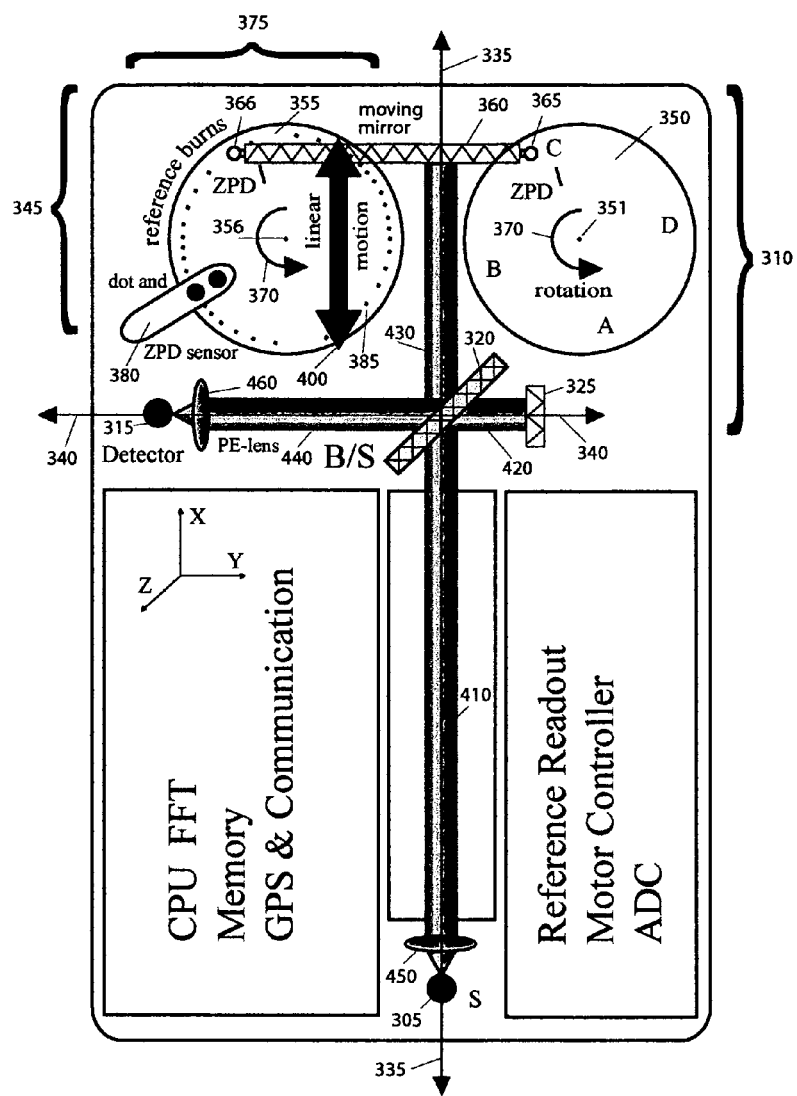
FIGS. 1A and 1B are schematic diagrams illustrating a Fourier transform (FT) infrared spectrometer of the present invention.

This invention is based, at least in part, on the substitution of large linear scanning motion mechanisms typically employed in scanning interferometers with a rotating arrangement to create linear motion of the moving reflector. This replacement eliminates the dead time required for acceleration and deceleration of the reflector in typical scanning interferometers. Complex linear scanner electronics, and mechanical, high maintenance linear bearings (air or magnetic levitation, etc) are no longer required. Interferometers and spectrometers of this invention display the inherent stability and simplicity of the rotating device. Additionally, substitution of a large linear, constant velocity scanning motion mechanism (as in conventional FT spectrometers) with a rotating arrangement to create linear displacement eliminates the "dead time" required for acceleration and deceleration of the mirror when direction is changed. This "dead time' is a large part of the time needed for taking measurement in conventional spectrometers. In the current invention, measurement can be performed continuously as long as the instrument is running (a full rotation represents a forward and backward can of the moving mirror). This allows for more extensive spectro- and photometric averaging, greatly enhancing accuracy of the method. This can often effectively shorten the time needed to obtain the information that is needed.

The invention in certain preferred embodiments is based upon replacement of the Helium-Neon lasers typically employed to track the position of the moving reflector with a marker reading scheme. This replacement eliminates the high voltage power supply for the laser, and the additional separate interferometer (optics and electronics) needed for tracking.

Further, in IR applications, bulky and heavy salt crystal beamsplitters (which can be delicate, difficult to manufacture and often highly sensitive to moisture) can be replaced by a small, light-weight plastic/metal mesh that with proper and complementary combination of material transmittance, provides superior coverage of the entire spectral range for IR measurements.

The principles of operation of Michelson interferometers and Fourier-Transform infrared spectrometers are well-known in the art and have been described in detail, see, for example, B. C. Smith "*Fundamentals of Fourier Transform Infrared Spectroscopy*" CRC Press, 1995. The following brief simplified description of Fourier spectroscopy employing a scanning interferometer is provided for improved clarity. The broad-band light range (wavelength [in micrometer] or frequency [in $cm^{-1}$]) is divided into a number of elements. For example, the mid-infrared range 4000-0 $cm^{-1}$ of 4,000 $cm^{-1}$ is divided into 8,000 elements (0.5 $cm^{-1}$ each). A continuous spectrum over this range can be approximated by 8,000, ½ $cm^{-1}$ each, discrete frequencies (or wavelengths) or spectral elements. Each spectral element is tagged with its own mechanical modulation frequency, which is equal to the number of its full wavelength crossings through the beamsplitter during the 1 s of the mirror movement. Numerically, that modulation frequency range will depend on the velocity of the moving mirror and it is typically selected to fall between 100-20,000 Hz (the range of audio frequencies). This is dictated by the typical detector time constant and speed of the analog-to-digital converter (adc). The interferometer catalogs the set of discrete wavelengths (from the broad band) according to their modulation frequencies. To each such frequency a sine function is ascribed whose period will relate to primary wavelength and the amplitude is related to the primary intensity of the spectral element. Effectively, the interferometer converts the initial broad-band spectrum (wavelength vs. intensity) into an interferogram (time vs. detector voltage). In other words, the initial spectrum (that is the sum of discrete wavelengths) is converted into an interferogram which is the sum of corresponding sine functions. Fourier transformation (FT) converts the interferogram back into the spectrum. If nothing is inserted into the light beam between the light source and detector, the cumulative attenuation of the source spectrum by the beamsplitter and optics will be measured. The detector response profile will also be included in this measurement. If an absorbing sample is inserted in front of the detector, the sinusoids corresponding to the absorption frequencies of the sample will be removed from the interferogram, and after FT, the corresponding wavelength elements will be missing from the spectrum.

For the mid-infrared range noted above, 4,000×2×3=24,000 points are needed to characterize the full band pass of 4,000 $cm^{-1}$ with ½ $cm^{-1}$ resolution we need (For practical purposes in this explanation we assume that three points are needed to minimally define the element of resolution.) Thus, at least that many data points will be needed to collect an interferogram exhibiting that resolution. The maximum precision of spectrometric determination (the resolution) will depend on the accuracy of the determination of the position of the moving mirror (i.e., the second reflector) at each point during its entire cycle or range of movement. Maintaining this accuracy is important for accurate identification of chemical species and other applications for such spectrometers. The scanning interferometer of this invention provides this accuracy of performance without the need of large, heavy, complex, and expensive elements that are required in all current FTIR machines.

Various device configurations of the scanning interferometers of this invention are described in more detail in the drawings. Referring to the drawings, like numerals indicate like elements and the same number appearing in more than one drawing refers to the same element. In addition, hereinafter, the following definitions apply:

The terms "electromagnetic radiation" and "light" are used synonymously in the present description and refer to waves of electric and magnetic fields. Electromagnetic radiation useful for the methods of the present invention includes, but is not limited to, ultraviolet light, visible light, infrared light, microwaves, or any combination of these. Selection of the wavelength distribution of electromagnetic radiation used in the methods of the present invention may be based on a number of factors including but not limited to the absorption spectrum and/or concentration of one or more analyte compounds to be identified, monitored and/or characterized in terms of concentration.

The terms "intensity" and "intensities" refers to the square of the amplitude of an electromagnetic wave or plurality of electromagnetic waves. The term amplitude in this context refers to the magnitude of an oscillation of an electromagnetic wave. Alternatively, the terms "intensity" and "intensities" may refer to the time average energy flux of a beam of electromagnetic radiation or plurality of electromagnetic radiation, for example the number of photons per square centimeter per unit time of a beam of electromagnetic radiation or plurality of beams of electromagnetic radiation.

"Beamsplitter" refers to any device or device component capable of separating an incident beam into two or more beam components. Beamsplitters of the present invention may separate an incident beam into substantially equivalent beam components or substantially dissimilar beam components. For example, beamsplitters of the present invention include 50/50 beamsplitters which divide an incident beam into two beam components that have substantially equivalent intensities, preferably having intensities within 5% of each other. Beamsplitters of the present invention may be polarization insensitive or polarization selective. An exemplary beamsplitter of the present invention comprises a beamsplitter, such as a gold beamsplitter, attached on the polyethylene or a diamond substrates.

"Parallel" refers to a geometry in which two surfaces or axes (lines) are equidistant from each other at all points and have the same direction or curvature. "Perpendicular" refers to geometry in which two surfaces or axes are oriented at an angle of 90 degrees from each other (at all points).

Rotational axes of elements herein can be concentric with axes aligned or offset where the axes are not concentric.

The term sample is used very broadly herein to apply to liquid, solid or gaseous samples. A sample may be any volume or size. A sample may represent gases in a room or exiting a pipe. The sample may be remote from the interferometer or may be positioned in a holder near or inserted into an optical path of the interferometer.

The scanning interferometers of this invention can be employed in any application in which conventional scanning interferometers have been applied. For example, scanning interferometers can be employed in spectrometers for obtaining spectra of chemical compositions, scanning interferometers can also be employed as tunable filters to generate or process modulated electromagnetic radiation in a selected wavelength or range.

The scanning interferometers of this invention can be employed in, particular in, FT spectrometers, particularly in FT Infrared spectrometers (FTIR). An FT spectrometer of this invention comprises a scanning interferometer of this invention comprising an actuator for changing the difference in optical path lengths of the interferometer in which rotational displacement is converted into linear displacement of at least one reflective surface which forms an optical path of the interferometer. The FT spectrometer further comprises a source of electromagnetic radiation of selected appropriate wavelength range for the application and a detector of electromagnetic radiation for the source wavelength range. The source of electromagnetic radiation and the detector may be remote from the scanning interferometer. The sample to be assessed with the spectrometer is introduced into the output beam [from interferometer] prior to detection. The FT spectrometer may be provided with more than one light source providing different wavelength ranges and/or more than one detector for detection of different wavelength ranges to provide for operation over a selected wavelength range spanned by the more than one sources and/or detectors. As will be apparent to one of ordinary skill in the art, components of the scanning interferometer, i.e., the beamsplitter, the reflectors and any other optical components, are selected for operation within the selected operational wavelength range of the spectrometer. For example, a beamsplitter and reflectors that function in the infrared wavelength range are employed in an FT infrared spectrometer. In a specific embodiment, an FTIR spectrometer is provided employing a scanning interferometer as exemplified in FIG. 1 which is adapted by choice of beamsplitter, reflectors, light source(s) and detector(s) for operation in the infrared spectral region is provided. In another specific embodiment, an FTIR spectrometer is provided employing a scanning interferometer as exemplified in FIGS. 2A and B which is adapted by choice of beamsplitter, reflectors, light source(s) and detector(s) for operation in the infrared spectral region is provided.

Again, as is apparent to one of ordinary skill in the art, an FT spectrometer requires power sources for operation of its components. FT spectrometers optionally have data conversion, data storage, data transmission, and/or data display components. Such components are selected for compatibility with other spectrometer components and with the application in which the spectrometer is employed. An FT spectrometer can optionally be provided with or linked to components for data analysis, e.g., for performing a Fourier transform of the output data collected. For example, collected data can be transmitted to a remote component, e.g., a remote computer, for data analysis. In this case, the spectrometer would be provided with a transmitter.

In a specific embodiment, the invention provides a portable FT spectrometer which comprises a scanning interferometer of this invention, one or more sources of electromagnetic radiation, e.g., selected light-emitting diodes, a motor controller and a portable power supply, e.g., one or more batteries. The portable FT spectrometer further comprises one or more data conversion, data storage, data transmission, and/or data analysis components. The portable FT spectrometer may further comprise one or more detectors.

In a specific embodiment, the invention provides a portable FT spectrometer, which in a preferred embodiment is a hand-held portable FT spectrometer. The FT spectrometer of this invention can, for example, be provided as a hand-held device having a volume on the order of 100 cc with weight in the range of one pound and preferably less. In another specific embodiment, the invention provides a low-cost, hand-held FT spectrometer. The FT spectrometer of this invention can, for example, be provided as a hand-held device with manufacturing cost of the order of $100.00.

In a specific embodiment, the invention provides a portable FTIR spectrometer, which in a preferred embodiment is a hand-held portable FT spectrometer. The FTIR spectrometer of this invention can, for example, be provided as a hand-held device having a volume on the order of a 100 cc. In another specific embodiment, the invention provides a low-cost, hand-held FTIR spectrometer. The FTIR spectrometer of this invention can, for example, be provided as a hand-held device with manufacturing cost of the order of $100.00.

In specific embodiments, disk drive motors can be provided to implement the actuators herein. In other specific embodiments, to enhance uniformity of rotation and stabilize reflector movement, one or more motors with a larger number of poles to eliminate or minimize jumping irregularities can be employed.

In a specific embodiment, FT spectrometers of this invention can be provided with a global positioning system and a cell/satellite data chip to facilitate unmanned remote applications.

In additional embodiments, electrical power for the scanning interferometers of this invention can be supplied by batteries (e.g., one or more Li batteries), by a solar energy converter (e.g., an auxiliary solar PV source), or by an external power supply (e.g., via a connection to a conventional building supply, by connection to a generator, or by connection to a vehicle battery). For remote operations, the use of light-emitting diodes (e.g., IR LEDs for IR operation) as the light source are preferred because they consume substantially less power than alternative light sources. To conserve power in remote applications with limited power resources the interferometer and/or FT spectrometer can be adapted to function in a "semi-pulse" mode in which the power is switched on and off on demand. In other embodiments, light sources that consume larger amounts of power, e.g., a resistively heated micro glowbar for IR operation, can be employed where power consumption is not a problem. Miniature motors and processor chips which have relatively low power requirements can be employed. A small LCD or acoustic user interface may be employed in certain spectrometer applications, particularly for "on the spot decisions" concerning substance analysis (as may be needed in law-enforcement applications). Such user interfaces or displays are expected to require the use of larger battery packs.

In specific embodiments, the interferometers and spectrometers of this invention can be provided with several dedicated electronic components. For example, controller chips that ensure smooth and stable startup and steady routine operation of any motors used for propelling rotatable elements can be employed. Commercial available controller chips can be employed or modified, if necessary, to handle the range of rotation rates (RPM) needed for various applications. Rotation rates are expected to be in the range of about 60-600 rpm for exemplified devices operated as FTIR spectrometers.

One or more analog-to-digital converter (adc) chips can be employed to facilitate interferogram data collection and to facilitate monitoring positional changes of the reflectors. In specific embodiments, standard 24-bit 500 kHz processors can be used. In a further specific embodiment, a dot reading diode can be employed to provide an analog signal that will be digitized and converted into a square function to serve as a triggering chain for starting points of the IR signal collection. The digitizer registers the "cumulative" detector voltage induced by the radiation falling onto a detector between the two consecutive triggers. A small signal pre-amplifier circuit is optionally integrated with the detector. In specific embodiments, very compact data storage (typically data size ranges from a few kb to 20 kb, or 50 kb for a maximum spectral range) is provided in a portable spectrometer (e.g. flash memory). For Fourier transform applications, Fourier processing can be provided in a main within the spectrometer unit or data may be transmitted by wires or a cell/satellite data transmission chip to a remote site for processing. In specific embodiments a remote interferometer or spectrometer can be fitted with a GPS chip for keeping automatic records of exact coordinates of the places where data was acquired.

As will be appreciated by those of ordinary skill in the art, software routines may be employed for controlling the operation of the interferometers or spectrometers as well as for data acquisition and data processing including appropriate forms of presentation of information to the user. In particular software routines can be provided for the drivers for controlling driving mechanism (e.g., motors), for synchronizing the reference dot reading scheme, and its adc square-wave output with data collection. In general, any software routines needed can be readily adapted from by routine modification of existing routines. Well-known and very mature and stable numerical algorithms for FFT are available and can be applied for access to useful spectral information. In particular applications, it may be advantageous to employ a scheme with equitemporal signal sampling (in which the reflector moves in the X direction with a sinusoidally varying in time speed, while the wheel rotates with constant angular velocity), which will require modification of conventional numerical Fourier transform algorithms.

In general, optical components typically employed in conventional scanning interferometers can be employed here. Optical components, as is known in the art, are selected for operation in a selected wavelength range. For example, fused silica (200 nm to 2.5 μm/50 000 $cm^{-1}$ to 4000 $cm^{-1}$) or calcium fluoride (1 μm to 10 μm/10 000 $cm^{-1}$ to 1000 $cm^{-1}$) beamsplitters can be employed for the wavelength ranges indicated.

In preferred embodiments for portable interferometers and spectrometers, optical components are made of light weight materials, such as polyethylene, e.g., polyethylene lenses and beamsplitters. The use of plastic lenses is a particularly good solution for dedicated narrower spectral range applications where achromatic errors can be neglected. For broader spectral ranges, metallized plastic off-axis ellipsoidal or parabolic mirrors of appropriate size can be used to avoid achromatic distortions. The beamsplitter may be a simple wire mesh of various patterns. In a preferred specific embodiment, described in more detail below, a beamsplitter prepared from polyethylene (PE-$H_4$), perdeuterated polyethylene (PE-$D_4$) or a combination of both materials (See: FIGS. 3A-C and 5 for beamsplitter configurations) is used to support the beamsplitting component which may, for example, be a wire-mesh, a photoresist metal grid or a germanium layer. In specific embodiments, the interferometer reflectors, particularly any moving reflectors, can also be made out of plastic. In a preferred embodiment, reflectors can be molded into an array of corner-cube retroreflectors from a ultrahigh precision metal master form (precision of a fraction of the arc second can be obtained). The reflectors can be gold coated to obtain maximum reflectance by a vacuum deposition technique (or by electroplating). Reflectors comprising a plurality of corner-cube retroreflectors provide for greater tolerance for mechanical motion perturbations of the interferometer. In some dedicated applications, narrow band path optical filters can be inserted into the radiation beam to maximize detection sensitivity.

In general any detectors appropriate for the operating wavelength range of the interferometers or spectrometers can be employed. For example, silicon photodiodes (200 nm to 1.5 μm/50 000 $cm^{-1}$ to 6700 $cm^{-1}$) and/or indium antimonide detectors (1 μm to 5.5 μm/10 000 $cm^{-1}$ to 1800 $cm^{-1}$) can be employed in the ranges indicated. In specific embodiments, for IR applications, small semiconductor IR radiation detectors are preferred. For example, a pyroelectric deuterated triglycine sulfate (DTGS) IR detector can be used. For example, silicon photodiodes (200 nm to 1.5 μm/50 000 $cm^{-1}$ to 6700 $cm^{-1}$) and/or InAsSbP photodetector with thermoelectric micro cooler, and micro parabolic light collector (1 μm to 5.5 μm/10 000 $cm^{-1}$ to 1800 $cm^{-1}$) can be employed.

Those of ordinary skill in the art will appreciate that some deviation in relative orientation of device elements can be tolerated without significant detriment to operation of a device. Herein terms which are used to describe the orientational or spatial relationship of one or more device elements, such as parallel, perpendicular, coaxial, concentric and the like are intended to encompass deviations from the noted orientation or spatial relationship which do not substantially negatively impact the operation of the device or device element. Preferably, the negative impact of such deviations affect the accuracy of the output by less than about 2.5% compared to the output that would be obtained without the deviation. More preferably, the negative impact of such deviations affect the accuracy of the output by less than about 5% compared to the output that would be obtained without the deviation.

When a group of alternatives, such as device elements, is disclosed herein, it is understood that all individual members of those groups and all subgroups thereof are disclosed separately. When a Markush group or other grouping is used herein, all individual members of the group and all combinations and subcombinations possible of the group are intended to be individually included in the disclosure. Every combination of components and every device configuration described or exemplified herein can be used to practice the invention, unless otherwise stated. Whenever a range is given in the specification, for example, a temperature range, a wavelength range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

The invention illustratively described herein suitably may be practiced in the absence of any element or elements, limitation or limitations which is not specifically disclosed herein.

One of ordinary skill in the art will appreciate that materials, device elements, light sources, light detectors, calibration methods, driving mechanisms, spectroscopic methods and analytical methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art All references cited herein are incorporated by reference in their entirety. Some references provided herein are incorporated by reference to provide details concerning sources of starting materials, additional starting materials, additional reagents, additional methods of synthesis, additional methods of analysis and additional uses of the invention.

EXAMPLE 1

Fourier Transform Infrared Spectrometer Design Configurations

It is a goal of the present invention to provide Fourier transform infrared spectrometers for detecting, monitoring and/or determining the concentration of a wide range of molecules and molecular mixtures in a variety of environments including the solid phase, liquid phase, gas phase and colloidal suspensions. In addition, it is a goal of the present invention to provide Fourier transform infrared spectrometer design configurations well suited for miniaturization and having low power consumptions. Further, it is a goal of the present invention to provide low cost Fourier transform infrared spectrometers having sensitivities, resolutions and scanning wavelength ranges necessary for a diverse range of applications including in situ monitoring of ambient pollutants, identifying and detecting hazardous chemical agents, monitoring the concentrations of drugs in a patient's blood stream in real time, and providing process and/or quality control in a variety of industrial settings such as chemical synthesis, food processing and the manufacture of pharmaceuticals.

To achieve the aforementioned goals, the present invention provides Fourier transform infrared spectrometers having a movable reflector that is selectably positionable along an optical axis of a beam component in dual beam interferometer Particularly, Fourier transform infrared spectrometers designs of the present invention provide a movable reflector that is capable of establishing and maintaining a substantially constant angular orientation relative to the optical axis of a beam component of a dual beam interferometer.

Figure 1B:
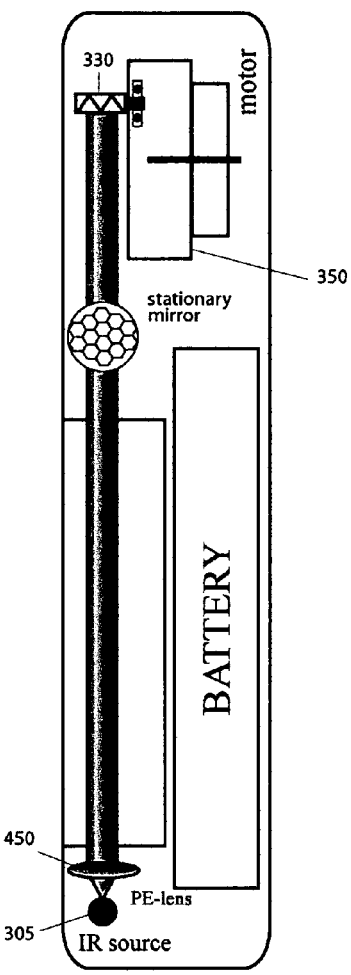

FIGS. 1A and 1 B are schematic diagrams illustrating a Fourier transform infrared spectrometer of the present invention. FIG. 1A provides a top plan view and FIG. 1B provides a side view. The Fourier transform infrared spectrometer 300 shown comprises a light source 305, an interferometer 310 and a detector 315. Interferometer 310 comprises a beamsplitter 320 in optical communication with the stationary reflector 325 and the movable reflector 330. In the embodiment shown in FIG. 1A, the beamsplitter 320 and movable reflector 330 intersect a first optical axis 335, and beamsplitter 320 and stationary reflector 325 intersect a second optical axis 340. Interferometer 310 further comprises moving reflector assembly 345 that is operationally coupled to movable reflector 330, and capable of selectably adjusting the position of movable reflector 330 along first optical axis 335.

Moving reflector assembly 345 comprises a first rotatable body 350 capable of rotation about a first rotational axis (extending out of the plane of FIG. 1A and schematically represented by point 351) and a second rotatable body 355 capable of rotation about a second rotational axis (extending out of the plane of FIG. 1A and schematically represented by point 356). As illustrated in FIG. 1A, first and second rotational axes 351 and 356 are preferably substantially parallel axes, and rotatable bodies 350 and 355 may comprise discs having diameters selected over the range of about 5 millimeters to about 50 millimeters, preferably 10 millimeters for some applications. First and second rotatable bodies 350 and 355 are connected by a linking element 360 that is attached to the movable reflector 330. Use of a linking element having a high flexural rigidity is preferred for embodiments requiring a substantially constant angular orientation of moving reflector 330 about first optical axis 335. In the embodiment shown in FIGS. 1A and 1B, linking element 360 and the first rotating body 350 are connected by a first pin 365 which is rotatably connected to the first rotatable body 350 at a point that does not lie along first rotational axis 351, and linking element 360 and the second rotating body 355 are connected by a second pin 366 which is rotatably connected to the second rotatable body 355 at a point that does not lie along second rotational axis 356. Rotatable connection of first and second pins 365 and 366 may be provided by using any means known in the art including the use of a variety of bearing configurations, such as sliding contact bearings, rolling bearings, thrust bearings, slot bearings, journal bears, ball bearings, and flanged journal bearings.

Moving reflector assembly 345 may further comprise one or more actuators (schematically represented in FIG. 1A by arrows 370) which may be coupled to first rotatable body 350, second rotatable body 355, or both. In one embodiment of the present invention, actuators 370 provide substantially synchronized rotation of first rotatable body 350 and second rotatable body 355 about first rotational axis 351 and second rotational axis 356, respectively. Exemplary actuators comprise miniature motors such as the type used for rotating computer micro disc drives. Optionally, moving reflector assembly 345 may further comprise additional device components to improve synchronization of first and second rotatable bodies 350 and 355. Such device components and methods of their use are well known in the art and include, but are not limited to, use of a belt or toothed belt positioned around first and second rotating bodies, use of a gear or tooth gear positioned between first and second rotating bodies, use of tandem encoded wheels or any combination of these.

Also shown in FIG. 1A, are the optical paths of an incident beam 410, a first beam component 420, a second beam component 430 and a detected beam 440. As illustrated in FIG. 1 A, optical source 305 generates incident beam 410 which is passed through collimating lens 450 and propagates along first optical axis 335. An exemplary incident beam has a spot size equal to approximately 2-5 millimeters in diameter. In one embodiment, the light source comprises a broad band (e.g. 10,000 cm$^{-1}$-500 cm$^{-1}$) such as miniature high intensity carbon nanocomposite (a-CNC) thermoresistive element. Alternatively, the light source may comprise a light emitting diode source (each emitting somewhere in the IR range, as required by application, with a width of 10 to 500 cm$^{-1}$) or a plurality of light emitting diode sources.

The incident beam 410 is directed onto beamsplitter 420 which separates the incident beam 410 into the first beam component 430 propagating along first optical axis 335 and a second beam component 420 propagating along the second optical axis 340. In one embodiment, the beamsplitter 320 is a 50/50 beamsplitter and, thus, first and second beam components have substantially the same intensities. The second beam component is reflected by stationary reflector 325 and is redirected back to beamsplitter 320. The first beam component is reflected by moving reflector 330 and is redirected back to beamsplitter 320. Use of corner-cube retro reflectors having a thin gold film on their reflective surfaces is preferred for some applications because they are capable of maintaining the same optical direction from reflector to beamsplitter upon reflection and provides high reflectivity first and second beam components 420 and 430 are coherently combined at beamsplitter 320, undergo optical interference, thereby forming detected beam 440 which passes through focusing lens 460 and is detected by detector 315. The nature (either constructive or destructive) and extent of the interference depends on the difference in optical path length of first and second beam components which is determined by the position of moving reflector 330 along first optical axis 335 for any particular wavelength. For example, when the optical path lengths between the beamsplitter and the moving and stationary reflectors are the same, the light at all wavelengths will interfere simultaneously constructively giving rise to a large spike for the signal as measured by the detector.

In the embodiment illustrated in FIGS. 1A and 1B, rotation of the first and second Rotatable bodies 350 and 355 about their respective rotational axes results in translation of moving reflector 330 along first optical axis 335. In an embodiment preferred for some spectroscopy and chemical sensing applications, rotation of the first and second rotational bodies 350 and 355 provides linear displacement of the movable reflector perpendicularly to an axis connecting first and second pins. The motion of moving reflector 330 is schematically illustrated in FIG. 1A by arrow 400. In one embodiment, the off-center arrangement of the present invention provides a displacement of the position of the moving reflector along the first optical axis as a function of time provided by the equation:

$$d = R(1 - \cos(\omega t)); \quad (1)$$

where d is the displacement of the position of the moving reflector along the first optical axis 335, R is the distance between the first rotational axis 351 and the first pin 365, $\omega$ is rotational velocity of both first and second rotating bodies 350 and 355 and t is time. In this equation, zero displacement corresponds to a position of moving reflector 330 closest to beamsplitter 320 at a time equal to zero (t=0) and the maximal displacement is 2 R at $\omega$t equal to $\pi + 2n\pi$ ($\omega t = \pi + 2n\pi$) where n is a sequence of integers. In an embodiment of the present invention, the rotational velocity of first and second rotatable bodies is selected over the range of about 10 rotations per minute to about 600 rotations per minute, preferably about 30 rotations per minute to about 60 rotations per minute for some applications. In an embodiment of the present invention providing a miniature Fourier transform infrared spectrometer, the distance (R) between the first rotational axis 351 and the first pin 365 is selected over the range of about 0.25 centimeter to about 20 centimeters, preferably from about 0.25 centimeters to about 0.5 centimeters for miniaturized Fourier transform infrared spectrometer applications, and preferably from about 2.5 centimeters to about 10 centimeters for higher resolution spectroscopy applications.

In a preferred embodiment, of the present invention, the first rotatable body 350, the second rotatable body 355 and the linking element are arranged such that the angular orientation of moving reflector 330 with respect to first optical axis 335 remains substantially constant during rotation of first and second rotatable bodies. Maintaining a constant angular orientation of moving reflector 330 during translation along first optical axis 335 minimizes deviations from the first optical axis of the optical paths of beams and beam components reflected by the movable reflector 330. Minimizing such angular deviations provides enhanced control over the phase shift imparted to the second beam component resulting in enhanced resolution of the Fourier transform infrared spectrometer. In addition, minimizing such angular deviations enhances the throughput of light through the interferometer which may result in enhanced sensitivity.

Several means of minimizing deviations in the angular position of moving reflection 330 with respect to first optical axis 335 may be employed in the present invention. First, selection of the distance between the first rotational axis 351 and first pin 365 substantially equal to the distance between the second rotational axis 356 and second pin 366 may enhance stability with respect to the angular orientation of moving reflector 330. Second, selection of a distance between first and second pins 365 and 366 equal to the distance between first and second rotational axes 351 and 356 may also enhance the stability of the angular orientation of the moving reflector 330 during translation along first optical axis 335. Third, synchronized rotation of first and second rotational bodies 350 and 355 at substantially equal rotational velocities also minimizes deviations in the angular orientation of movable reflector 330 with respect to first optical axis 335. For example, embodiments of the present invention wherein both first and second rotatable bodies are driven in a synchronized manner using independent actuators may provide improved stability with respect to unwanted deviations in the angular orientation of the movable reflector.

Figure 1C:
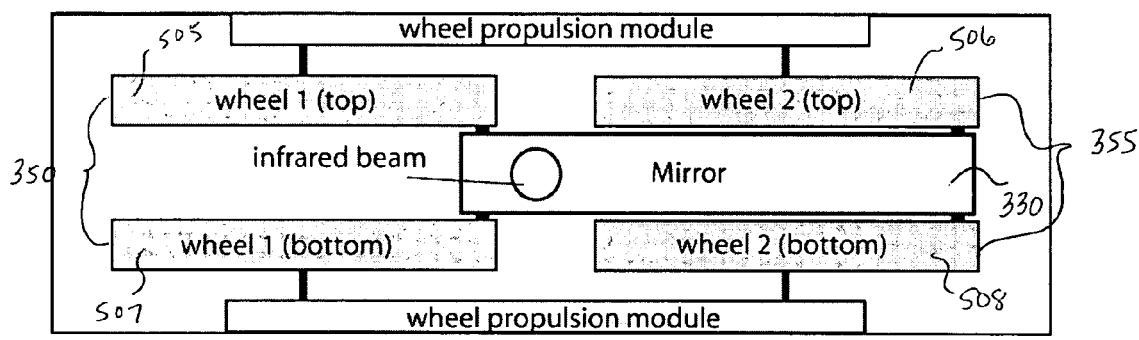
FIG. 1C is a schematic illustration of an alternative arrangement of rotatable elements for use in the device of FIGS. 1A and 1B. The single wheel rotatable elements of FIG. 1A are replaced with a pair of concentric wheels. Between which the mirror is mounted.

FIG. 1C illustrates an alternative arrangement of rotatable bodies or elements which provides for improved stability. Each rotatable body of FIG. 1A (i.e., 350 and 355) is replaced with a pair of concentrically mounted wheels (505, 506 (top wheels) and 507 and 508 9bottom wheels), each a rotatable body). The second reflector (330) is rotatably mounted between the pairs of wheels and rotatably attached to each of member of both pairs of wheels. This arrangement avoids tilting of the mirror. As noted above, the second reflector may be the linking element or the second reflector may be mounted on the linking element. The driving mechanism for the rotatable elements in this configuration may be one motor (with appropriate coupling to the three remaining wheels), two motors (one for each pair of wheels or one for the top wheels and one for the bottom wheels) or four motors one for each wheel. The driving mechanism for the wheels is synchronous, as described above. The driving mechanism schematically illustrated provides separate drivers (i.e., motors for the top and bottom wheels.)

Figure 2A:
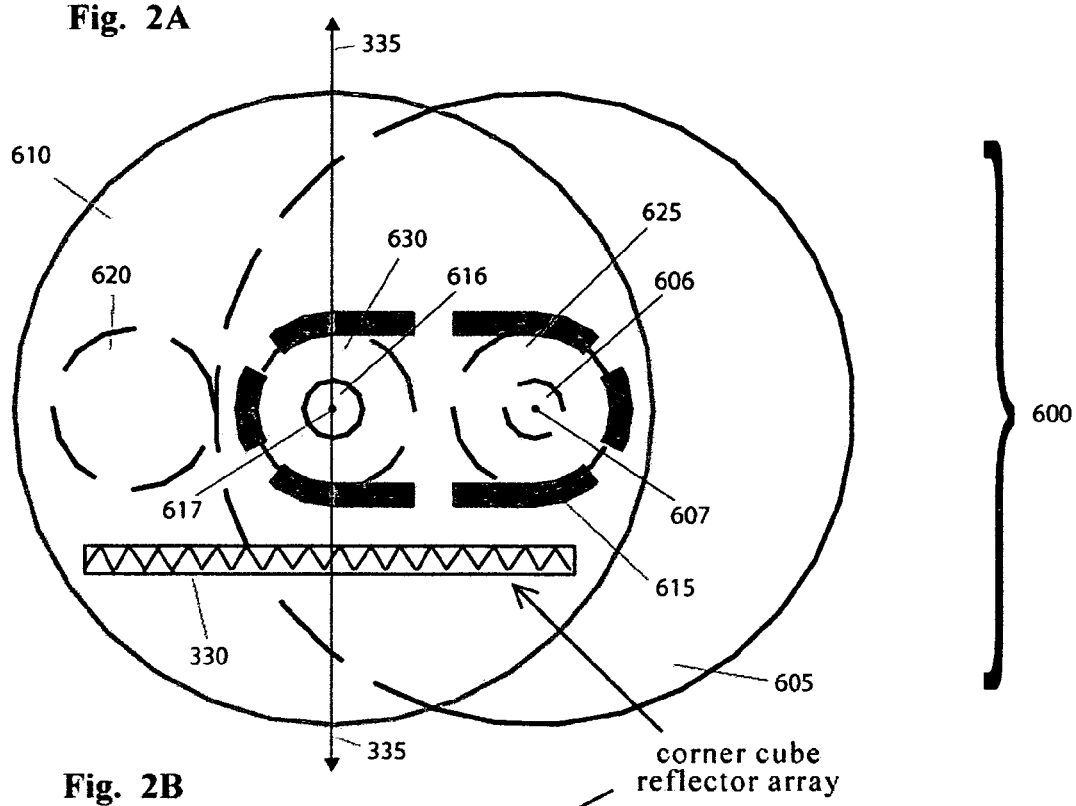
FIGS. 2A and 2B are schematic drawings of an alternative assembly for moving the second reflector.
Figure 2B:
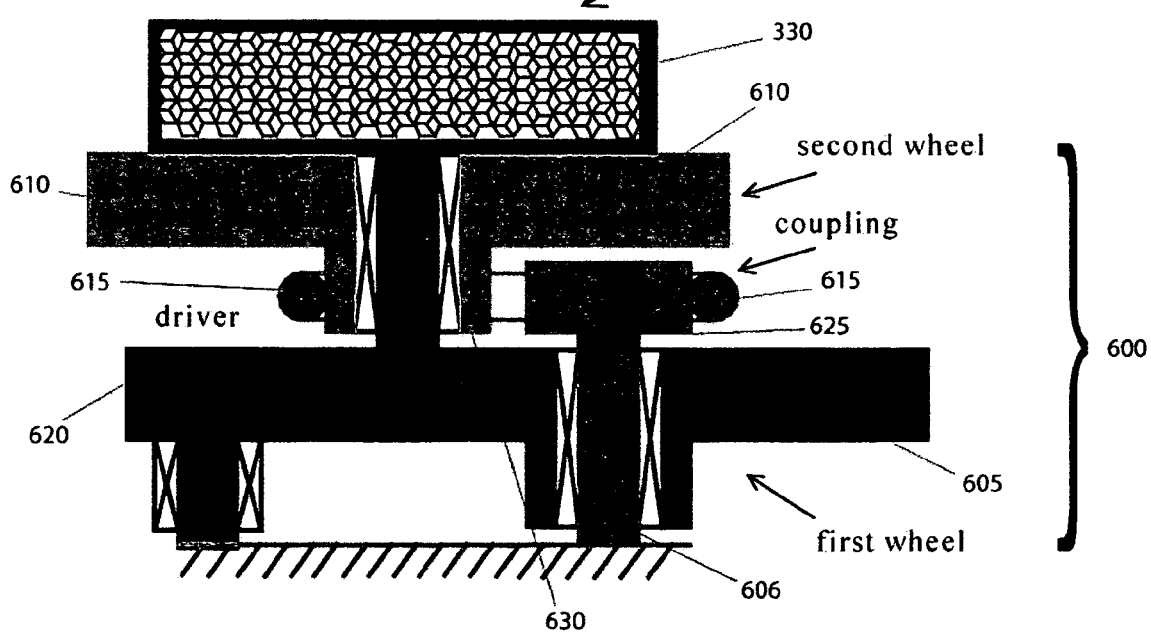

FIGS. 2A and 2B are schematics of an alternative moving reflector assembly useful for Fourier transform spectrometers and interferometers of the present invention. FIG. 2A provides a top plan view and FIG. 2B provides a side view. As shown in FIGS. 2A and 2B, moving reflector assembly 600 comprises a rotatable body 605 and a translating body 610 which is attached to movable reflector 330. Rotatable body 605 is mounted on a shaft 606 which is positioned along first rotational axis 607 (extending out of the plane in FIG. 2A and schematically represented by point 607). Translating body 610 is rotatably connected to a crank pin 616 on rotatable body 605. As shown in FIGS. 2A and 2B, crank pin 616 is positioned about second rotational axis (extending out of the plane in FIG. 1A and schematically represented by point 617) which does not overlap but is substantially parallel to first rotational axis 607. Moving reflector assembly 600 further comprises coupler 615 connected to translating body 610 and shaft 606. This arrangement provides for translation of translating body 610 about rotational axis 607 upon rotation of rotatable body 605. Coupler 615 also ensures that the angular orientation of translating body with respect to first optical axis 335 is maintained substantially constant during translation of translating body 610 about rotational axis 607. Coupler 615 may be a belt, toothed belt, gear, toothed gear, chain or any functional equivalent known in the art. Accordingly, the translating body 610 and the rotatable body 605 undergo rotation motion relative to each other in different directions about crank pin 616. Moving reflector assembly 600 further comprises actuator 620 operationally coupled rotatable body 605 and capable of providing for rotation of rotatable body 605 about rotational axis 607. Optionally, moving reflector assembly 600 may further comprise first wheel 625 fixedly attached to shaft 606 and a second wheel 630 fixedly attached to the translating body 610.

In the embodiment illustrated in FIGS. 2A and 2B, rotation of rotating body 605 results in translation of movable reflector 330 along first optical axis 335. In one embodiment, the off-center crank pin arrangement of the present invention provides a displacement of the position of the moving reflector along the first optical axis as a function of time which may described by Equation 1, wherein R is equal to the distance between first rotational axis 607 and second rotational axis 617. Moving reflector assembly 600 is capable of translating moving reflector 330 in a manner maintaining a substantially constant angular orientation of moving reflector 330 with respect to first optical axis 335. Similar to the embodiment shown in FIGS. 1A and 1B, the present invention provides several means for minimizing angular deviation of moving reflector 330 including use of a first wheel 625 and a second wheel 630 having substantially identical diameters. Further, corner-cube reflectors may be used to minimize the impact of angular deviations occurring during the translation of the moving reflector 330.

Optionally, moving reflector assemblies 345 and 600 may further comprise a means for measuring the position of the moving reflector at a function of time. In the embodiment, illustrated in FIGS. 1A and 1B, an encoded wheel system 375 is provided which comprises optical reader 380 in optical communication with a rotating surface 385 of second rotating body having a plurality of indicators (represented by the series of dots on rotating surface 385) distributed on the rotating surface 385. Optical reader may comprise a light source, such as a semiconductor laser or light emitting diode, capable of directing an incident beam onto the rotating surface 385 and a detector, such as a photodiode or photomultiplier tube, capable of detecting light reflected, transmitted and/or scattered from the rotating surface 385. Indicators on rotating surface may comprise markers having absorption, reflection and/or scattering characteristics different that the absorption, reflection and/or scattering characteristics of the rotating surface, which are selectively positioned about the rotating surface 385. Upon rotation of the second rotating body 355 about second rotational axis 356, optical reader detects 380 changes in the intensity of light reflected and/or scattered from the rotating surface 385, which correspond to movement of indicators into the incident beam provided by the light source of the optical reader. These changes of intensity provide a measurement of the angular orientation of the rotating surface 385 as a function of time. The present invention includes embodiments having an encoded wheel systems coupled to the first rotatable body 350, the second rotatable body 355 or both. The present invention includes embodiments having an encoded wheel system coupled to rotatable 605.

In one embodiment, a circular train of markers/indicators is placed on one or more the rotational bodies near its perimeter with the appropriate spacing. They are detected during the wheel motion and each detection turns on (triggers) the start of data collection by the IR detector. Since all the times of data collection (or positions of the moving mirror) are cataloged together with corresponding voltages, the interferogram is uniquely defined and data measurement is accomplished. The spectral information is than retrieved by processing it using standard or modified FFT algorithm.

In one embodiment, along the perimeter of the rotatable bodies 350, 355 and/or 605 a circular strip of the substrate is attached having a circular chain of dots serving as indicators. For example, dots may be made 0.5 micrometer in size, and the space between dots may be selected to be 0.5 micrometer. On a rotatable body comprising a disc having a 10 millimeters ($d=10^{-2}$) diameter approximately 30,000 dots may be generated ($l=\pi d$; $l=3.1415\times10^{-2}$ m divided by $10^{-6}$ (number of micrometers per meter)=$3.142\times10^{4}$. The dots may be equally spaced or may be spaced unequally. The dots can be produced by any means known in the art including photolithography, standard compact disk writing techniques, and/or magnetic recording. The dots may be detected and read by the appropriate optical or magnetic technique. The start of the run (reading cycle) will be triggered by detecting a dot (or several of them) placed on the wheel at a somewhat smaller radius by the separate zero-crossing detector. In one embodiment providing IR data collection triggering signals corresponding to a constant rate of IR data collection, the dots may be positioned at varying distances, such as those shown in FIG. 1A (e.g. denser around points A and C, and distributed more sparsely in the vicinity of points B and D) in such a way that rotating with constant angular velocity, the disk will produce a trigger signal for each equidistant position of the mirror during its linear motion along the X axis, namely $x=\frac{1}{2}d\cos\omega t$.

In another embodiment, a metallic strip on the rotating body (such as a disc), inside its perimeter, is ablated by pulsed-laser to create a circular pattern of non-reflecting round or elongated dots.

Note that a variety of shapes and sizes of markings can be employed in this method. Further note that the markings can be made distinguishable by shape, size, pairing with other markers, or reflectivity. In general any optically detectable property can be used to make markings distinguishable.

In one embodiment, train of signal pulses will be generated by the optical reader, digitized and immediately converted to a square function that will be used to control the IR data acquisition starting times. The detailed analysis of the dot shape, dot boundary, etc., may be performed by an algorithm using a processor, and the criteria for the timing scheme (pulse threshold, width, amplitude, etc.) may be then determined by an algorithm using a processor.

In another embodiment, a pattern of dots serving as indicators will be generated on the rotatable body (e.g. a disc) having equal angular spacing around the rotatable body. In this embodiment equitemporal data sampling will produce somewhat different interferograms, due the fact that the mirror will travel different distances in equal time intervals, at any time during each principal ¼ revolution. A fast Fourier transform (FFT) algorithm for the numerical transformation of the data from time to energy domains may be modified accordingly, for example by substituting the commonly used constant mirror velocity with a mirror velocity varying sinusoidally in time. This approach may be preferred for some applications. Equally spaced reference dots serving as indictors may be preferred because they are more easily prepared and may be prepared with greater precision with respect to their positions. In addition, standard electronics are better suited for data processing at constant rate (most of the adc's are designed to digitize an analog signal for equal time intervals).

Use of bearings in the present invention may be required to assist with less than perfect fitting of mechanical parts, such as the linking element and rotational bodies. Centrifugal forces induced during rotation, due to the off-axis attached mass (e.g. movable reflector 330) may disrupt ideal rotational motion. In the present invention, this effect is minimized by using low rotational velocities (e.g. 10-600 rpm, preferably 30 or 60 rpm]) and using a very low off-axis attached mass (e.g. approximately 1 gram). In addition, disruption from ideal rotational motion may also be minimized by precision mass-balancing of the rotational bodies. In principle, this may be performed in a fashion similar to balancing car wheels. However, in the present invention this may be achieved by removing, with great accuracy, a compensating amount of mass on both sides of the reflector axial/bearing assembly (i.e. linking element 360) for example by drilling tiny holes. Use of small angular velocities and low mass movable reflectors alleviates most of the potential problems associated with non-ideal rotational motion. In addition, use of corner-cube reflector arrays (manufactured with high precision) as a reflector may be used to further compensate for non-ideal rotational motion. Further, micro drive motors are extremely stable electromechanical components, with lifetimes of several years in continuous operation and there is a large selection of the ultra-high precision/performance bearings available compatible with such motors.

A significant advantage of the interferometer and Fourier transform spectrometer designs of the present invention is that they are compatible with miniaturization, exhibit very low power consumption and may be manufactured at a low cost. The interferometer designs of the present substitute a rotating moving reflector assembly arrangement to generate linear motion of the moving reflector for the large linear scanning motion mechanism employed in many conventional interferometers and Fourier transform spectrometers. This replacement may eliminate the "dead time" required for acceleration and slowing down of the reflector, as is the case in many conventional interferometer and spectrometer designs. In addition, it eliminates the need for complex linear scanner electronics, and mechanical, high maintenance linear bearings, such as those provided by air or magnetic levitation. The design takes advantage of the inherent stability and simplicity of a device based on rotational motion. The helium-neon laser requiring a high voltage power supply, and separate interferometer (optics and electronics) common in many conventional Fourier transform spectrometers is replaced in the present invention with a "dot" reading scheme using a low power consumption light source, such as a light-emitting diode. Moreover, bulky, heavy and very costly salt crystal beamsplitters may be replaced by a beamsplitter comprising a small plastic/metal mesh that with proper and complementary combination of material transmittance. Use of a small plastic/metal mesh will provide superior transmission/reflection in the infrared region in comparison to convention salt crystal beamsplitters and may provide significant transmission/reflection over the entire infrared region of the electromagnetic spectrum. Thus, the interferometer and Fourier transform spectrometer designs of the present invention facilitate simplification of the design and miniaturization.

The present invention, includes embodiments wherein rotatably bodies (350, 355 or 605) rotate about their rotational axes with substantially constant rotational velocities (after spinning up) and embodiments wherein the rotational velocities of rotatable bodies are selectably varied during a measurement. In an embodiment of the present invention, rotatable bodies (350, 355 or 605) rotate about their rotational axes with rotational velocities selected from the range of about 60 revolutions per minute to about 600 revolutions per minute.

Optical sources useable in Fourier Transform infrared spectrometers of the present invention include any source capable of providing radiation in the infrared region of the electromagnetic spectrum. Optical sources providing an incident beam of substantially constant intensity and distribution of wavelengths are preferred for some spectrochemical analysis applications. Optical sources having low power consumption and long lifetimes are also preferred for some applications of the present invention. Exemplary optical sources include but are not limited to resistively heated elements, glow bars, miniature high intensity carbon nanocomposite (a-CNC) thermoresistive elements light-emitting diodes, arrays of light emitting diodes or any combination of these.

Lenses useable in the present invention are preferably high transmissive in at least a portion of the infrared region, preferably high transmissive throughout the entire infrared region of the electromagnetic spectrum (e.g. 14,000 cm$^{-1}$ to about 50 cm$^{-1}$). In one embodiment of the present invention, collimating lens 450 and focusing lens 460 are comprised of polyethylene or perdueterated polyethylene. Alternatively, metalized plastic off-axis ellipsoidal or parabolic mirrors may be used rather than lenses for focusing and collimation. An advantage of the use of to such ellipsoidal or parabolic mirrors is that chromatic distortions may be minimized or avoided.

Reflectors useable in interferometers of the present invention are preferably highly reflective in at least a portion of the infrared region, preferably high transmissive throughout the entire infrared region of the electromagnetic spectrum (e.g. 14,000 $cm^{-1}$ to about 50 $cm^{-1}$). Exemplary interferometer reflectors may be made out of plastic to provide low weight and mechanically robust optical components. Reflectors useable in the present invention may be molded into an array of corner-cube retro reflectors from a ultrahigh precision metal master form (precise to a fraction of the arc second). Reflectors useable in the present invention may be gold coated for good reflectance over a broad range of infrared wavelengths. Such gold coated reflectors may be prepared by vacuum deposition techniques or by electroplating well known in the art. Such exemplary reflectors provide good tolerance on mechanical motion perturbations.

Any detector capable of detecting infrared radiation may be employed in Fourier transform spectrometers of the present invention. In some applications one or more narrow band path optical filters may be provided in the optical path of incident and or detected light beams to maximize detection sensitivity. Exemplary detectors include semiconductor IR radiation detectors, photomultiplier tubes, photoconductive detectors and photodiodes. Pyroelectric deuterated triglycine sulfate (DTGS) detectors are particularly useful for some applications of the present invention due to their broad wavelength response throughout a wide range of the infrared spectral region (8000 $cm^{-1}$-50 $cm^{-1}$).

An exemplary Fourier transform infrared spectrometer of the present invention has several dedicated electronic components. The motor used to propel the rotatable body may have a controller chip to ensure its smooth and stable startup and steady routine operation. Widely used commercial controller chips may be modified to handle much lower RPM (instead of usual 7-9 krpm required for the hard disk drives this device will work in a 60-600 rpm range). The dual analog-to-digital converter (adc) chip may facilitate indicator (e.g. dot)-reading scheme and IR data collection. This will be standard dual 24-bit 500 kHz processor. The indicator (e.g. dot) reading diode will provide the analog signal that will be digitized and converted into a square function serving as a triggering chain for starting points of the IR signal collection. A digitizer will register the "cumulative" detector voltage induced by the light falling onto a detector between the two triggers. A small signal pre-amplifier circuit may be provided that is integrated with the detector (see FIG. 1A). The data (typically a few kb to 20 kb, or 50 kb for a max) spectral range may be further substantially compressed and placed in very compact storage (e.g. flash memory) and either on-board Fourier-processed by the unit's main processor or transmitted for processing by wires or a cell/satellite data transmission chip. A mobile, remote unit may be fitted with a GPS chip for keeping automatic records of exact coordinates of places where data was acquired.

In an exemplary embodiment, a Fourier transform infrared spectrometer of the present invention is small and its electrical power needs will be supplied by several high-capacity Li batteries and by an auxiliary solar PV source (for truly remote applications), or by an external power supply (vehicle battery or generator or regular building supply). The broad-range IR light source (e.g. resistively heated micro glowbar) will consume the biggest fraction of the energy. However, scanning a very large spectral range may likely be performed in environments like airports and buildings, where additional power consumption is not an issue. For remote applications the infrared light emitting diodes may be used to detect or monitor concentrations of chemicals in better defined, narrower spectral ranges because such optical sources consume substantially less power that typical broadband sources. The miniature motor and several processor chips also require a supply of electricity. However, these requirements are relatively small. In critical remote applications with limited power resources the device may be operated in a "semi-pulse" mode switching on and off periodically or on demand. The tiny visual (LCD) or acoustic (audio) user interface may be required for on the spot decisions in e.g., law-enforcement applications, calling for larger battery pack. It is likely that in order to provide highest uniformity of rotation and consequently very stable mirror movement (in mass production) it may be necessary to develop a specialized motor with larger number of poles to eliminate the jumping irregularity. The higher rotational speed of disk drive motors combined with larger mass load ensures more stable motion due to larger inertia. It may be important to design the optimal steering pulse width (shorten it) to minimize power consumption.

The package of software for controlling the operation of the spectrometer and data acquisition and initial processing, including appropriate forms of presentation of information to the user and the drivers for controlling the slow spinning motor, and to synchronize the reference dot reading scheme, its adc square-wave output with data collection, may be developed by modifying and adopting existing routines and algorithms. Mature and stable numerical algorithms for FFT will be employed in cases where spectral fitting and deconvolution is performed on the spot for immediate access to spectral information. A modified numerical Fourier transform algorithm may be used with equitemporal signal sampling (i.e. mirror will move in the X direction with a sinusoidally varying in time speed).

User interfaces are tailored for particular applications of the present invention. In some applications, the user will query the system as to whether selected chemicals are present and with what level of concentration and measurement confidence. In other applications, the change of monitored species will be provided and presented visually (graphically) or by audio means. The quantitative determinations may be based on known infrared extinction coefficients (or absorption cross-sections) for compounds of interest. These considerations will be true as well for the Raman scattering spectroscopy, electronic absorptions and emissions in the visible and near-IR regions if the hardware needed for extending operating range or sampling hardware will be added to our setup. The present invention also encompasses web-based databases and interpretation services for the mass usage of spectrometers of the present invention.

EXAMPLE 2

Beamsplitter for Fourier Transform Infrared Spectrometer

The present invention also comprises beamsplitters and optical geometries for use in multiple beam interferometers and Fourier transform spectrometers. Beamsplitters of the present invention are particularly well suited for use in infrared Fourier transform spectrometers due to their ability to efficiently transmit and reflect electromagnetic radiation throughout the infrared region of the electromagnetic spectrum. The transmission and reflection properties of beamsplitters of the present invention provide spectral access to substantially the entire infrared region of the electromagnetic region, which allows a wide range of chemical species, including molecules and molecular mixtures, to be monitored and/or identified by the methods and devices of the present invention. In addition, the present invention provides beamsplitters that may be easily fabricated at a substantially lower cost than conventional salt beamsplitters.

Figure 3A:
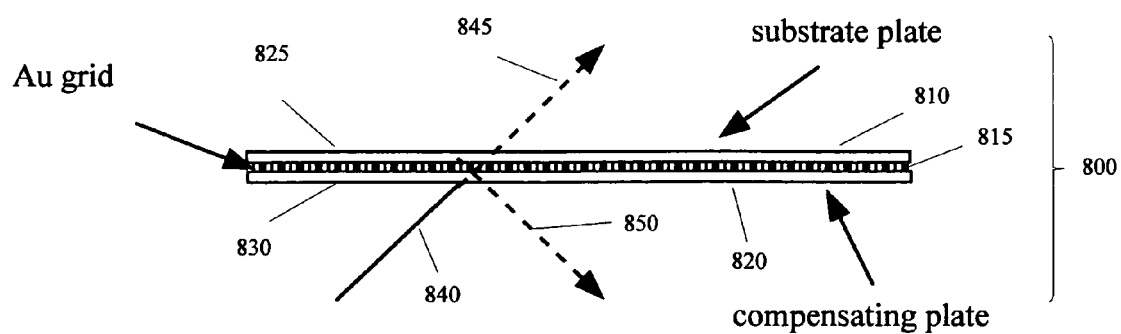
FIGS. 3A and 3B illustrate an exemplary beamsplitter of this invention which is particularly useful in the scanning interferometers of this invention.
Figure 3B:
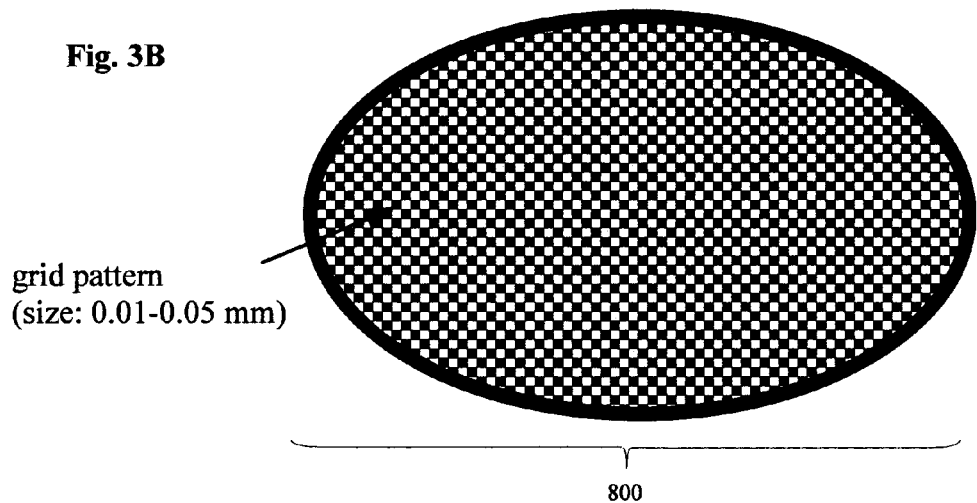

FIGS. 3A and 3B show an exemplary beamsplitter of the present invention. FIG. 3A provides a side view and FIG. 3B provides a top plan view. Beamsplitter 800 comprises a patterned reflective layer 815 positioned between a substrate layer 810 and a compensating layer 820. Substrate layer 810 and compensating layer 820 may comprise polymer layers, preferably made of polyethylene, and preferably having substantially the same thickness. Patterned reflective layer 815 is a pattern comprising a plurality of reflective regions (represented by the dark rectangles in FIGS. 3A and 3B) comprising one or more thin metal layers. In an exemplary embodiment, patterned reflective layer 815 may comprise a plurality of interconnected reflective stripes or bars, or may comprise a plurality of independent reflective regions having selected shapes and surface areas.

Exemplary reflective regions comprise one or more thin gold films. As shown in FIG. 3B, the pattern of reflective regions forms a complementary pattern of transmissive regions (represented by the white rectangles in FIGS. 3A and 3B) wherein the reflective regions are not present. Patterns of beamsplitters of the present invention may comprise symmetrical patterns of reflective regions having a variety of shapes, including circular, square, diamond, elliptical, rectangular shapes. Use of reflective regions and transmissive regions without sharp edges is beneficial for some applications. Use of a substantially symmetrical pattern or reflective and transmissive regions is desirable when similar spatial intensity distributions of first and second beam components are preferred. Particularly, similar spatial intensity distributions of first and second beam components may be useful for maximizing the extent of optical interference in a dual beam spectrometer. Alternatively, the present invention includes beamsplitters having asymmetrical patterns of reflective regions and transmissive regions. The present invention also includes embodiments wherein the substrate layer 810 and a compensating layer 820 comprise diamond plate (flat).

In an alternative embodiment, a beamsplitter of the present invention comprises a thin germanium coating sandwiched between polyethylene substrate and compensating layers (or perdeuterated polyethylene for different working range).

FIG. 3A schematically illustrates the interaction of an incident beam directed onto optical face 830 of beamsplitter 800. As shown in FIG. 3A, beamsplitter 800 separates incident beam into a first beam component 845 that is transmitted through the plurality of transmissive regions and a second beam component 850 that is reflected by the plurality of reflective regions. In the embodiment depicted in FIGS. 3a and 3B, compensating layer 820 functions correct for changes in direction of the transmitted portion of the incident beam caused by diffraction occurring upon passage through the substrate layer.

In an embodiment of the present invention well suited for using in a dual beam interferometer, the surface area corresponding to reflective regions is substantially equal to the surface area corresponding to transmissive regions. This embodiment comprises a 50/50 beamsplitter wherein and first and second beam components 845 and 850 are substantially equal in intensity. Beamsplitters of the present invention may be used with a range of incident beam angles, not merely the 45 degree angle of incidence depicted in FIG. 3A. Beamsplitters of the present invention may have any shape including circular, square, rectangular, ellipsoidal shapes. Beamsplitters of the present invention also provide similar reflection and transmission behavior if an incident beam is directed onto optical face 825.

Figure 3C:
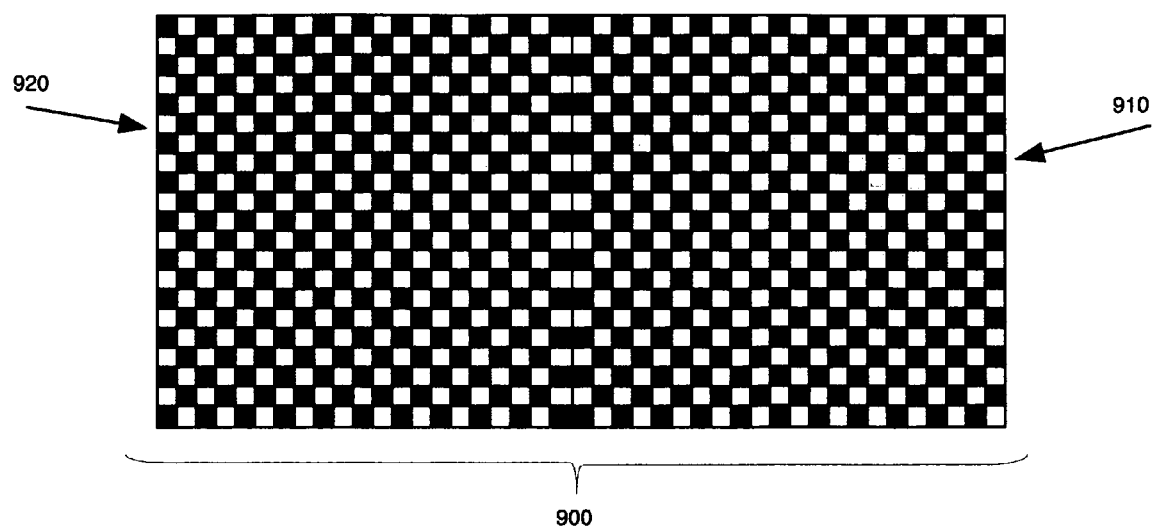
FIG. 3C provides a side view of a divided beamsplitter of this invention.

FIG. 3C provides a side view of a divided beamsplitter of the present invention having two discrete transmission/reflection regions. The divided beamsplitter 900 comprises a first beamsplitter region 910 and a second beamsplitter region 920. First and second regions 910 and 920 are characterized by different substrate and compensation layer compositions. As the composition of each region influences the amount and wavelengths of light absorbed by the substrate layer and compensating layers, region 910 provides reflected and transmitted beam components having different intensity and wavelength distributions than region 920. In an exemplary embodiment of the present invention, the substrate layer and compensating layer of region 910 comprise polyethylene-$H_4$ and the substrate layer and compensating layer of region 920 comprise polyethylene-$D_4$. The present invention includes divided beamsplitters having more than two beamsplitter regions, wherein additional beamsplitter regions may have absorption characteristics similar to that of first or second regions or may have absorption characteristics different from either first or second regions.

Use of polyethylene in the substrate layer 810 and a compensating layer 820 is beneficial in the present invention because it allows for substantial transmission and reflection of light having wavelengths throughout a substantial portion of the infrared region of the electromagnetic spectrum (10,000 $cm^{-1}$ to about 70 $cm^{-1}$). Low density and/or high density polyethylene may be used in beamsplitters of the present invention. Use of low density polyethylene is preferred for some applications because it is less turbid and less opaque with respect to light in the infrared region of the electromagnetic spectrum. In addition, it is preferred that additives commonly present in polyethylene, such as plasticizers, be avoided as they can substantially absorb, reflect and/or scatter light in the infrared region. In an exemplary embodiment, substrate layer 810 and a compensating layer 820 have substantially equal thicknesses selected over the range of about 0.1 millimeter to about 0.5 millimeter. Selection of substrate layer 810 and a compensating layer 820 over this range of thicknesses is beneficial because it provides good mechanical strength and avoids the formation of undesirable fringe patterns.

Figure 4:
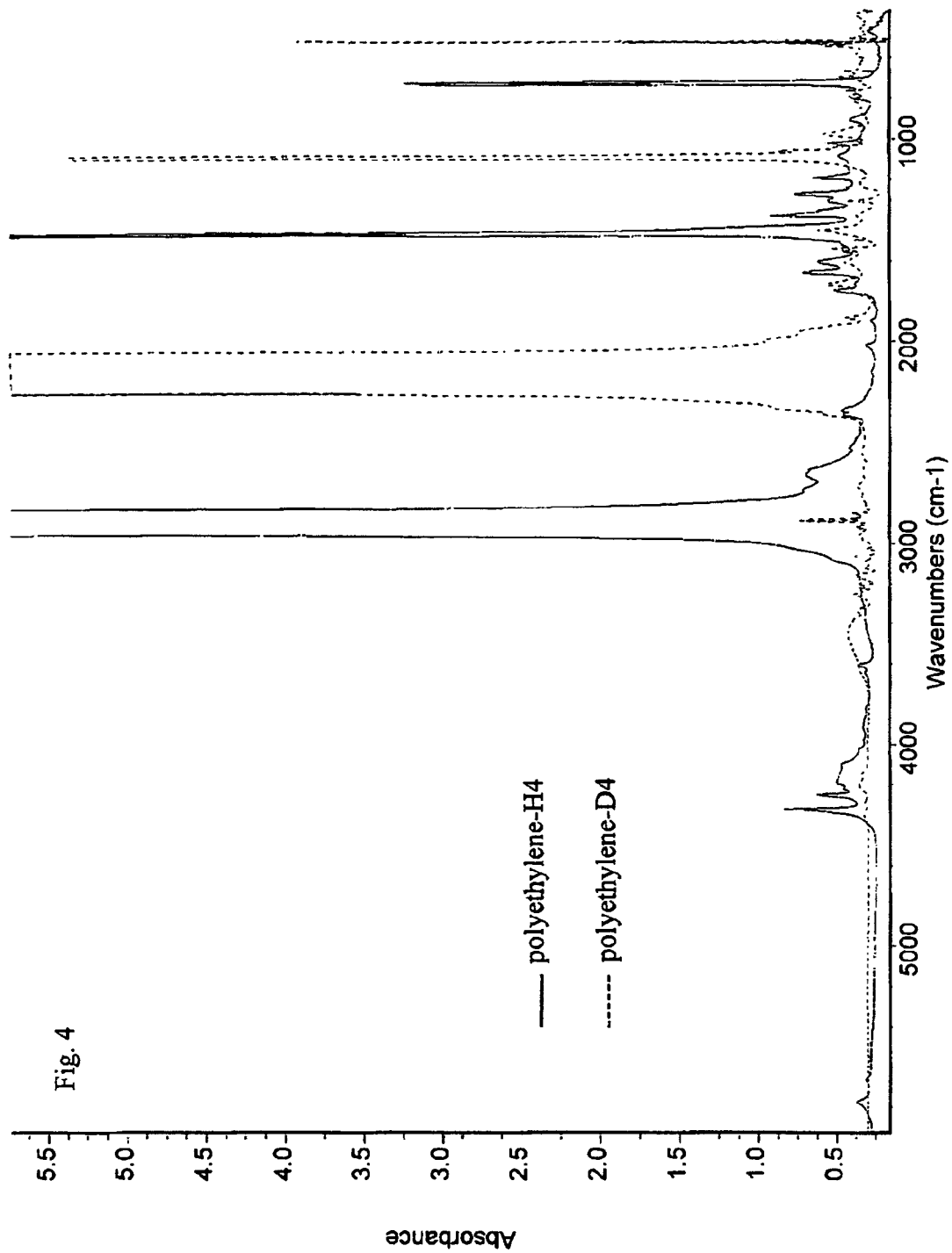
FIG. 4 provides the infrared spectrum of polyethene-$H_4$ (I) and that of polyethylene-$D_4$ (II).

Beamsplitters of the present invention may comprise polyethylene-$H_4$, polyethylene-$D_4$, or a combination of both polyethylene-$H_4$ and polyethylene-$D_4$. FIG. 4 shows the infrared spectrum of both polyethylene-$H_4$ (red line) and the infrared spectrum of polyethylene-$D_4$ (green line) As shown in FIG. 4, the infrared spectrum of polyethylene-$D_4$ is shifted substantially to lower wave numbers with respect to the infrared spectrum polyethylene-$H_4$. Use of polyethylene-$H_4$, polyethylene-$D_4$, or a combination of these materials is also beneficial because they also substantially transmit light in the visible and ultraviolet regions of the electromagnetic spectrum. In addition, use of polyethylene-$H_4$, polyethylene-$D_4$, or a combination of these materials allows beamsplitters of the present invention to be fabricated easily at low cost.

Beamsplitters of the present invention may be fabricated by photolithographic means, printing means, molding means, embossing means or other equivalents known in the art. In an exemplary method of making a beamsplitter of the present invention, thin metal, metalloid and/or semiconducting layers are patterned on the surface of substrate 810 via electron beam deposition, sputtering deposition or vapor deposition to form a grid of crossing narrow strips on the surface of substrate 810. After deposition, compensating layer 820 may be placed on top of the exposed surface of the deposited layers and attached via a hot press operating at about 140 to about 160 degrees Celsius and at a pressure of about 5 atmospheres to about 10 atmospheres. Alternatively, a beamsplitter of the present invention may be fabricated by depositing a thin germanium layer on the surface of the substrate layer 810. After deposition, the compensating layer 820 may be placed on top of the exposed surface of the germanium layer by means well known in the art.

Figure 5:
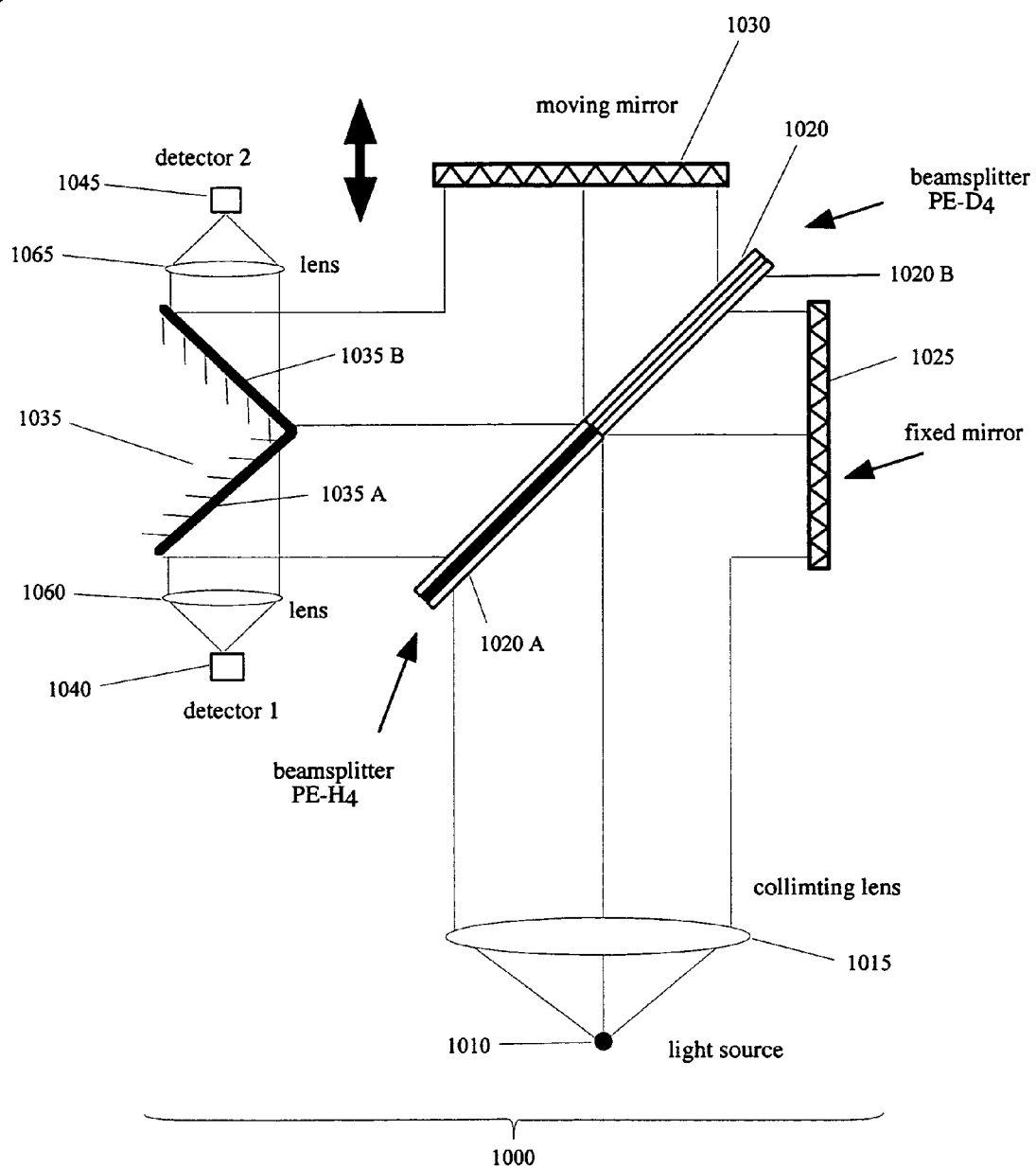
FIG. 5 illustrates an exemplary optical geometry of an interferometer of the present invention employing a divided beamsplitter havein two discrete transmission/reflection regions.
Figure 6:
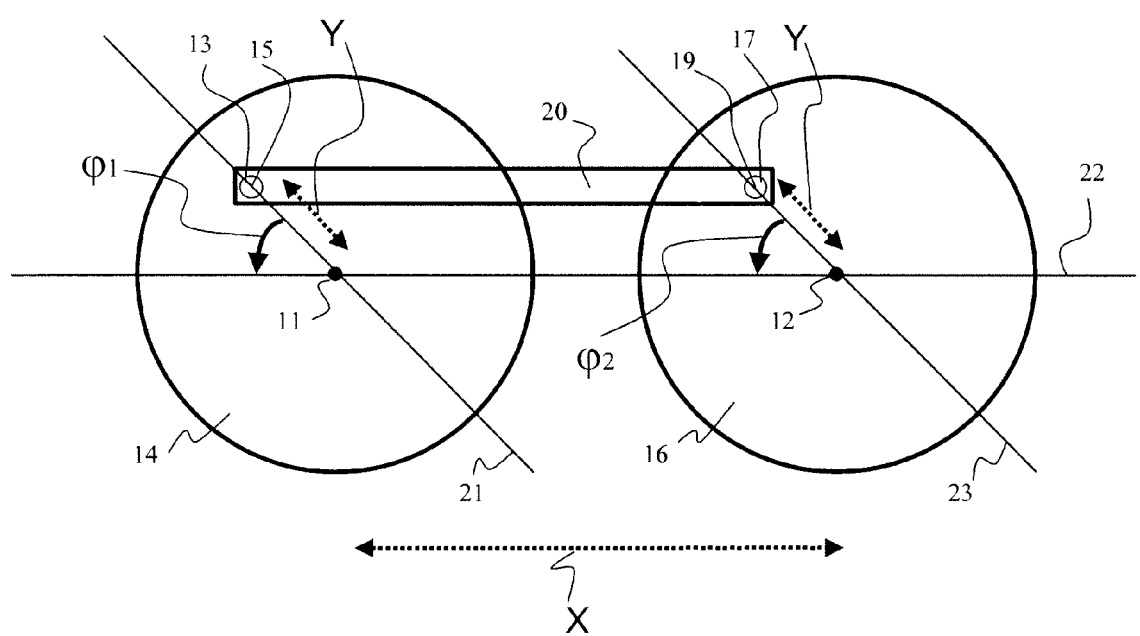
FIG. 6 illustrates a synchronous rotation scheme for an exemplary actuator of this invention.

FIG. 5 provides an optical geometry of an interferometer of the present invention employing a divided beamsplitter having two discrete transmission/reflection regions. The exemplary optical geometry 1000 comprises optical source 1010, collimating lens 1015, divided beamsplitter 1020, stationary reflector 1025, moving reflector 1030, beam uncoupler 1035, first detector 1040 and second detector 1045. As illustrated in FIG. 5, optical source 1010 generates an incident beam having a first distribution of wavelengths which passes through collimating lens 1015 and is directed onto divided beamsplitter 1020. Divided beamsplitter 1020 has a first transmission/reflection region 1020A and a second transmission/reflection region 1020B. In an exemplary embodiment, transmission/reflection region 1020A comprise a pattern of reflective sub regions or thin germanium layer position between polyethylene-$H_4$ substrate and compensating layers, and transmission/reflection region 1020B comprise a pattern of reflective sub regions or thin germanium layer position between polyethylene-$D_4$ substrate and compensating layers Interaction of the incident beam with first transmission/reflection region 1020A generates a reflected and transmitted beam components having a second wavelength and intensity distributions characterized by decreases or removal of light intensities of light having wavelengths absorbed by polyethylene-$H_4$ (see FIG. 4). Interaction of the incident beam with first transmission/reflection region 1020B generates a reflected and transmitted beam components having a third wavelength and intensity distributions characterized by decreases or removal of light intensities of light having wavelengths absorbed by polyethylene-$D_4$ (see FIG. 4). Reflected beam components having second and third wavelength and intensity distributions are reflected by stationary reflector 1025 and transmitted beam components having second and third wavelength and intensity distributions are reflected by moving reflector 1030.

Reflected and transmitted beam components having second wavelength and intensity distributions are coherently combined at region 1020A of divided beamsplitter 1020 and under optical interference. The resulting beam is reflected by first reflector 1035A of beam uncoupler 1035, is focused by focusing element 1060 and is detected by first detector 1040. Reflected and transmitted beam components having third wavelength and intensity distributions are coherently combined at region 1020B of divided beamsplitter 1020 and under optical interference. The resulting beam is reflected by first reflector 1035B of beam uncoupler 1035, is focused by focusing element 1065 and is detected by second detector 1045. In this manner, detected beams corresponding to second and third wavelength and intensity distributions are detected simultaneously.

The optical geometry illustrated in FIG. 5 provides a means of generating interference patterns corresponding to a very wide range of infrared wavelengths (e.g. corresponding to 10,000 $cm^{-1}$ to about 70 $cm^{-1}$). The ability to provide interference corresponding to such a large range of wavelengths provides scanning Fourier transform infrared spectrometers capable of observing and quantifying optical extinction (absorption and scattering) over essentially the entire infrared region of the electromagnetic spectrum. This provides spectrometers capable of monitoring a wide range of chemical species which absorb throughout the infrared region. The interferometer optical geometry shown in FIG. 5 may also be used for optical filtering applications (fixed optical filters and tunable optical filters), visible spectroscopy and ultraviolet spectroscopy.

Those of ordinary skill in the art will appreciate that devices, materials and methods other than those specifically exemplified herein can be employed in the practice of this invention without resort to undue experimentation. For example, although in the examples herein, scanning interferometers are implemented in Michelson interferometer configuration, the actuation and marking methods and devices described herein can with routine adaptation be implemented for scanning in a Mach-Zehnder interferometer configuration. The actuators herein can be readily adapted for actuation of the displacement of one or more moving reflectors in various scanning interferometer configurations.

I claim:

1. A scanning interferometer which comprises:
 (a) a beamsplitter;
 (b) a first reflector separated from the beamsplitter by a first optical path for passage of a first beam of electromagnetic radiation;
 (c) a second reflector separated from the beamsplitter by a second optical path for passage of a second beam of electromagnetic radiation wherein the position of the second reflector is selectively adjustable to selectively adjust the length of the second optical path and wherein the first and second optical paths intersect at the beamsplitter to allow recombination of the first and second beams of electromagnetic radiation;
 (d) an actuator which functions for selective adjustment of the length of the second optical path wherein the actuator converts rotational displacement of at least one rotatable element into linear displacement of the second reflector, the actuator comprising:
  (i) a first rotatable element that is rotatable around a first rotation axis;
  (ii) a second rotatable element that is rotatable around a second rotation axis;
  (iii) a linker element upon which the second reflector is mounted where the linker element is rotationally coupled between the first and second rotatable elements at coupling points on the first and second rotatable elements, respectively, which are each offset from the first and second rotation axes, respectively, by the same offset distance;
  and
  (iv) a driving mechanism for rotating the first rotatable element; and
 (e) an optical detector for determining the length of the second optical path;
 wherein rotation of the first rotatable element actuates synchronous rotation of the second rotatable element which in turn actuates linear displacement of the linker element and the second reflector mounted thereon, without rotating the linker element and the second reflector with respect to a line intersecting the first and second rotation axes of the first and second rotatable elements; wherein the first and second rotatable elements are first and second pairs of spaced-apart concentric rotatable elements, respectively; and wherein the linker is positioned between the spaced-apart concentric rotatable elements and is rotatably coupled to each member of both pairs of the spaced-apart concentric rotatable elements.

2. The scanning interferometer of claim 1 wherein the first and second rotation elements are synchronously rotated by coupling the rotation of the two rotatable elements with a coupling element and rotating one of the rotatable elements with the driving mechanism.

3. The scanning interferometer of claim 2 wherein the coupling element is a belt or gear.

4. The scanning interferometer of claim 1 wherein a driving mechanism is provided for each of the first and second rotatable elements and the driving mechanisms are electrically coupled to provide synchronous rotation.

5. The scanning interferometer of claim 1 wherein the first and second rotatable elements are mass balanced.

6. The scanning interferometer of claim 1 further comprising a collimator positioned with respect to the beamsplitter for forming a collimated beam on introduction of electromagnetic radiation from a light source into the beamsplitter.

7. The scanning interferometer of claim 6 further comprising a decollimator positioned with respect to the beamsplitter for focusing electromagnetic radiation exiting the beamsplitter.

8. The scanning interferometer of claim 1 further comprising a source of electromagnetic radiation positioned for introduction of electromagnetic radiation into the beamsplitter.

9. The scanning interferometer of claim 1 further comprising a second detector of electromagnetic radiation positioned to detect electromagnetic radiation exiting the beamsplitter.

10. The scanning interferometer of claim 1 further comprising a plurality of markings on at least one rotatable element which is detected with the optical detector to thereby determining the linear displacement of the second reflector.

11. The scanning interferometer of claim 10 wherein at least a portion of the markings on at least one rotatable element are uniquely distinguishable one from the other and wherein each distinguishable marking is associated with a given linear displacement of the second reflector.

12. The scanning interferometer of claim 11 wherein each one of the plurality of markings on at least one rotatable element is uniquely distinguishable one from the other.

13. The scanning interferometer of claim 10 wherein the beamsplitter and reflectors operate in the infrared spectral region and wherein the number of markings provided on the at least one rotatable element is sufficient to provide a minimum resolution of 0.5 of a wavenumber.

14. The scanning interferometer of claim 1 wherein the beamsplitter and reflectors operate in the infrared spectral region.

15. The scanning interferometer of claim 1 wherein the first or second reflectors are an array of corner-cube retroreflectors.

16. The scanning interferometer of claim 1 wherein the beamsplitter is made of polyethylene or a combination of polyethylene and perdeuterated polyethylene.

17. A method for detection of electromagnetic radiation, generated from a sample or that has passed through a sample, as interferograms which comprises the steps of:

(a) providing a scanning interferometer of claim 1;
(b) introducing electromagnetic radiation generated from a sample or from a source of electromagnetic radiation of selected wavelength range into the beamsplitter of the scanning interferometer;
(c) rotating at least one rotatable element at constant rotational velocity to continuously scan the range of possible linear displacements of the second reflector from a minimum to a maximum displacement and back from the maximum to the minimum displacement, wherein one full rotation of the at least one rotatable element represents two scans of the possible linear displacement range;
(d) periodically determining the length of the second optical path;
(e) periodically detecting electromagnetic radiation exiting the beamsplitter or periodically detecting electromagnetic radiation that has exited the beamsplitter and passed through a sample and collecting electromagnetic radiation data between each sequential determination of the length of the optical path to provide a plurality of portions of an interferogram, wherein collecting electromagnetic radiation data over a scan of the possible linear displacement range provides a full interferogram; and
(f) continuing steps (c)-(e) a number of times sufficient to collect a desired number of interferograms for signal averaging to obtain desired information.

18. A method for detection of electromagnetic radiation, generated from a sample or that has passed through a sample, as interferograms which comprises the steps of:

(a) providing a scanning interferometer of claim 10;
(b) introducing electromagnetic radiation generated from a sample or from a source of electromagnetic radiation of selected wavelength range into the beamsplitter of the scanning interferometer;
(c) rotating at least one rotatable element at constant rotational velocity to continuously scan the range of possible linear displacements of the second reflector from a minimum to a maximum displacement and back from the maximum to the minimum displacement, wherein one full rotation of the at least one rotatable element represents two scans of the possible linear displacement range;
(d) periodically determining the length of the second optical path by determining the linear displacement of the second reflector by detecting the markings on the at least one rotatable element;
(e) periodically detecting electromagnetic radiation exiting the beamsplitter or periodically detecting electromagnetic radiation that has exited the beamsplitter and passed through a sample and collecting electromagnetic radiation data between each sequential determination of the length of the optical path to provide a plurality of portions of an interferogram, wherein collecting electromagnetic radiation data over a scan of the possible linear displacement range provides a full interferogram; and
(f) continuing steps (c)-(e) a number of times sufficient to collect a desired number of interferograms for signal averaging to obtain desired information;

wherein detection of a marking on the at least one rotatable element triggers electromagnetic data collection of a portion of an interferogram and collection of that portion of an interferogram continues until the next marker in sequence is detected, a portion of an interferogram being collected between each pair of sequential markers and wherein the portions of an interferogram collected over a scan of the possible linear displacement range provide a full interferogram.

19. A method for detection of electromagnetic radiation, generated from a sample or that has passed through a sample, as interferograms which comprises the steps of:
(a) providing a scanning interferometer of claim 13;
(b) introducing electromagnetic radiation generated from a sample or from a source of electromagnetic radiation of selected wavelength range into the beamsplitter of the scanning interferometer;
(c) rotating at least one rotatable element at constant rotational velocity to continuously scan the range of possible linear displacements of the second reflector from a minimum to a maximum displacement and back from the maximum to the minimum displacement, wherein one full rotation of the at least one rotatable element represents two scans of the possible linear displacement range;
(d) periodically determining the length of the second optical path by determining the linear displacement of the second reflector by detecting the markings on the at least one rotatable element;
(e) periodically detecting electromagnetic radiation exiting the beamsplitter or periodically detecting electromagnetic radiation that has exited the beamsplitter and passed through a sample and collecting electromagnetic radiation data between each sequential determination of the length of the optical path to provide a plurality of portions of an interferogram, wherein collecting electromagnetic radiation data over a scan of the possible linear displacement range provides a full interferogram; and
(f) continuing steps (c)-(e) a number of times sufficient to collect a desired number of interferograms for signal averaging to obtain desired information;
wherein detection of a marking on the at least one rotatable element triggers electromagnetic data collection of a portion of an interferogram and collection of that portion of an interferogram continues until the next marker in sequence is detected, a portion of an interferogram being collected between each pair of sequential markers and wherein the portions of an interferogram collected over a scan of the possible linear displacement range provide a full interferogram.

* * * * *